(12) United States Patent
Uecker et al.

(10) Patent No.: US 10,870,164 B2
(45) Date of Patent: Dec. 22, 2020

(54) SYSTEMS, METHODS, AND APPARATUS TO PREHEAT WELDING WIRE

(71) Applicant: Illinois Tool Works Inc., Glenview, IL (US)

(72) Inventors: James Lee Uecker, Appleton, WI (US); Jake Zwayer, Appleton, WI (US); Christopher Hsu, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 450 days.

(21) Appl. No.: 15/596,387

(22) Filed: May 16, 2017

(65) Prior Publication Data

US 2018/0333798 A1 Nov. 22, 2018

(51) Int. Cl.
| | | |
|---|---|---|
| *B23K 33/00* | (2006.01) | |
| *B23K 9/10* | (2006.01) | |
| *B23K 9/235* | (2006.01) | |
| *B23K 9/173* | (2006.01) | |

(52) U.S. Cl.
CPC .......... *B23K 9/1012* (2013.01); *B23K 9/1093* (2013.01); *B23K 9/173* (2013.01); *B23K 9/235* (2013.01)

(58) Field of Classification Search
CPC .. B23K 9/1006; B23K 9/1012; B23K 9/1093; B23K 9/173; B23K 9/235
USPC ........ 219/136, 137 R, 137 PS, 137.2, 137.31
See application file for complete search history.

(56) References Cited

U.S. PATENT DOCUMENTS

| | | | |
|---|---|---|---|
| 2,365,958 | A | 12/1944 | Holslag |
| 2,416,047 | A | 2/1947 | Dolan |
| 2,976,462 | A | 3/1961 | Miller |
| 3,030,495 | A | 4/1962 | Anderson |
| 3,288,982 | A | 11/1966 | Haruyoshi |
| 3,725,629 | A | 4/1973 | Vickers |
| 3,809,853 | A | 5/1974 | Manz |
| 3,849,871 | A | 11/1974 | Kaunitz |

(Continued)

FOREIGN PATENT DOCUMENTS

| | | |
|---|---|---|
| AT | 413801 | 6/2006 |
| CA | 2072711 | 12/1992 |

(Continued)

OTHER PUBLICATIONS

Int'l Search Report and Written Opinion for PCT/US2018/029770 dated Sep. 12, 2018 (13 pgs.).

(Continued)

*Primary Examiner* — Sang Y Paik
(74) *Attorney, Agent, or Firm* — McAndrews, Held & Malloy, Ltd.

(57) ABSTRACT

A contact tip assembly with a preheating tip comprises a welding-type power source configured to provide welding-type current to a welding-type circuit, the welding-type circuit comprising a welding-type electrode and a first contact tip of a welding torch. The assembly also includes an electrode preheating circuit configured to provide preheating current through a portion of the welding-type electrode via a second contact tip of the welding torch, and a voltage sense circuit to monitor a voltage drop across the two contact tips, and the electrode preheating circuit adjusts at least one of the first current or the preheating current based on the voltage drop.

14 Claims, 20 Drawing Sheets

(56) References Cited

U.S. PATENT DOCUMENTS

| | | |
|---|---|---|
| 3,946,349 A | 3/1976 | Haldeman |
| 4,160,967 A | 7/1979 | Beech |
| 4,188,419 A | 2/1980 | Detert |
| 4,222,023 A | 9/1980 | Beech |
| 4,329,561 A | 5/1982 | Schafer |
| 4,426,565 A | 1/1984 | Rueter |
| 4,447,703 A | 5/1984 | Stol |
| 4,467,176 A | 8/1984 | Mizuno |
| 4,493,971 A | 1/1985 | Nawa |
| 4,531,040 A | 7/1985 | Nawa |
| 4,536,634 A | 8/1985 | Nawa |
| 4,546,234 A | 10/1985 | Ogasawara |
| 4,547,654 A | 10/1985 | Stol |
| 4,580,026 A | 4/1986 | Stol |
| 4,614,856 A | 9/1986 | Hori |
| 4,628,182 A | 12/1986 | Hori |
| 4,631,385 A | 12/1986 | Rothermel |
| 4,667,083 A | 5/1987 | Stol |
| 4,728,761 A | 3/1988 | Mucha |
| 4,897,523 A | 1/1990 | Parks |
| 4,950,348 A | 8/1990 | Larsen |
| 4,954,691 A | 9/1990 | Parks |
| 4,973,821 A | 11/1990 | Martin |
| 5,001,326 A | 3/1991 | Stava |
| 5,043,557 A | 8/1991 | Tabata |
| 5,086,207 A | 2/1992 | Deam |
| 5,101,086 A | 3/1992 | Dion |
| 5,118,028 A | 6/1992 | Ogawa |
| 5,140,123 A | 8/1992 | Mitani |
| 5,148,001 A | 9/1992 | Stava |
| 5,208,433 A | 5/1993 | Hellegouarc |
| 5,270,516 A | 12/1993 | Hamamoto |
| 5,278,390 A | 1/1994 | Blankenship |
| 5,315,089 A | 5/1994 | Hughes |
| 5,319,179 A | 6/1994 | Joecks |
| 5,343,023 A | 8/1994 | Geissler |
| 5,349,156 A | 9/1994 | Madigan |
| 5,352,871 A | 10/1994 | Ross |
| 5,367,138 A | 11/1994 | Moss |
| 5,412,184 A | 5/1995 | McGaffigan |
| 5,461,215 A | 10/1995 | Haldeman |
| 5,466,916 A | 11/1995 | Iguchi |
| 5,504,309 A | 4/1996 | Geissler |
| 5,526,561 A | 6/1996 | McGaffigan |
| 5,644,461 A | 7/1997 | Miller |
| 5,710,413 A | 1/1998 | King |
| 5,714,738 A | 2/1998 | Hauschulz |
| 5,739,506 A | 4/1998 | Hanton |
| 5,742,029 A | 4/1998 | Stava |
| 5,756,967 A | 5/1998 | Quinn |
| 5,760,373 A | 6/1998 | Colling |
| 5,773,799 A | 6/1998 | Maxfield |
| 5,783,799 A | 7/1998 | Geissler |
| 5,844,193 A | 12/1998 | Nomura |
| 5,963,022 A | 10/1999 | Buda |
| 5,968,587 A | 10/1999 | Frankel |
| 5,994,659 A | 11/1999 | Offer |
| 6,002,104 A | 12/1999 | Hsu |
| 6,008,470 A | 12/1999 | Zhang |
| 6,043,471 A | 3/2000 | Wiseman |
| 6,051,810 A | 4/2000 | Stava |
| 6,077,369 A | 6/2000 | Kusano |
| 6,090,067 A | 7/2000 | Carter |
| 6,107,602 A | 8/2000 | Geissler |
| 6,115,273 A | 9/2000 | Geissler |
| 6,160,241 A | 12/2000 | Stava |
| 6,169,263 B1 | 1/2001 | Derby |
| 6,204,476 B1 | 3/2001 | Reynolds |
| 6,248,976 B1 | 6/2001 | Blankenship |
| 6,259,059 B1 | 7/2001 | Hsu |
| 6,265,688 B1 | 7/2001 | Lyshkow |
| 6,274,845 B1 | 8/2001 | Stava |
| 6,278,074 B1 | 8/2001 | Morlock |
| 6,292,715 B1 | 9/2001 | Rongo |
| 6,331,694 B1 | 12/2001 | Blankenship |
| 6,359,258 B1 | 3/2002 | Blankenship |
| 6,479,792 B1 | 11/2002 | Beiermann |
| 6,486,439 B1 | 11/2002 | Spear |
| 6,515,259 B1 | 2/2003 | Hsu |
| 6,559,416 B1 | 5/2003 | Steenis |
| 6,583,386 B1 | 6/2003 | Ivkovich |
| 6,596,970 B2 | 7/2003 | Blankenship |
| 6,624,388 B1 | 9/2003 | Blankenship et al. |
| 6,642,482 B2 | 11/2003 | Rappl |
| 6,670,579 B2 | 12/2003 | Davidson |
| 6,707,001 B1 | 3/2004 | Ulrich |
| 6,710,297 B1 | 3/2004 | Artelsmair |
| 6,720,529 B2 | 4/2004 | Davidson |
| 6,744,012 B2 | 6/2004 | Ueda |
| 6,747,247 B2 | 6/2004 | Holverson |
| 6,849,828 B2 | 2/2005 | Aigner |
| 6,906,284 B2 | 6/2005 | Kim |
| 6,909,067 B2 | 6/2005 | Davidson |
| 6,933,466 B2 | 8/2005 | Hutchison |
| 6,958,263 B2 | 10/2005 | Bhattacharyya |
| 6,974,931 B2 | 12/2005 | Holverson |
| 6,974,932 B2 | 12/2005 | Holverson |
| 6,984,806 B2 | 1/2006 | Huismann |
| 6,995,338 B2 | 2/2006 | Hutchison |
| 7,002,103 B2 | 2/2006 | Holverson |
| 7,129,443 B2 | 10/2006 | Davidson |
| 7,145,101 B2 | 12/2006 | Tong |
| 7,244,905 B2 | 7/2007 | Das |
| 7,265,320 B2 | 9/2007 | Ou |
| 7,304,269 B2 | 12/2007 | Fulmer |
| 7,307,240 B2 | 12/2007 | Holverson |
| 7,351,933 B2 | 4/2008 | Huismann |
| 7,381,923 B2 | 6/2008 | Gordon |
| 7,683,290 B2 | 3/2010 | Daniel |
| 8,203,100 B2 | 6/2012 | Ueda |
| 8,288,686 B2 | 10/2012 | Kaufman |
| 8,487,215 B2 | 7/2013 | Holverson |
| 8,592,722 B2* | 11/2013 | Ulrich .................. B23K 9/0953 219/130.5 |
| 9,095,928 B2 | 8/2015 | Ash |
| 9,193,004 B2 | 11/2015 | Enyedy |
| 9,403,231 B2 | 8/2016 | Hutchison |
| 9,409,250 B2 | 8/2016 | Daniel |
| 9,539,662 B2 | 1/2017 | Hutchison |
| 9,862,050 B2 | 1/2018 | Cole |
| 9,950,383 B2 | 4/2018 | Davidson |
| 2002/0008095 A1 | 1/2002 | Norrish |
| 2002/0045970 A1 | 4/2002 | Krause |
| 2002/0107825 A1 | 8/2002 | Manicke |
| 2002/0117487 A1 | 8/2002 | Corby |
| 2002/0117488 A1 | 8/2002 | Arndt |
| 2003/0010756 A1 | 1/2003 | Enyedy |
| 2003/0058149 A1 | 3/2003 | Jayadeva |
| 2004/0010342 A1 | 1/2004 | Thelen |
| 2004/0069759 A1 | 4/2004 | Davidson |
| 2004/0182828 A1 | 9/2004 | Schmidt |
| 2004/0222204 A1 | 11/2004 | Hutchison |
| 2004/0238511 A1 | 12/2004 | Matus |
| 2005/0184039 A1 | 8/2005 | Stava |
| 2005/0218132 A1 | 10/2005 | Wells |
| 2005/0269306 A1 | 12/2005 | Fulmer |
| 2006/0138115 A1 | 6/2006 | Norrish |
| 2006/0163229 A1 | 7/2006 | Hutchison |
| 2006/0207980 A1* | 9/2006 | Jacovetty ............. B23K 9/1062 219/130.5 |
| 2007/0051711 A1 | 3/2007 | Kachline |
| 2007/0084840 A1 | 4/2007 | Davidson |
| 2007/0102407 A1 | 5/2007 | Uezono |
| 2007/0170163 A1 | 7/2007 | Narayanan |
| 2007/0235434 A1 | 10/2007 | Davidson |
| 2007/0267394 A1 | 11/2007 | Beck |
| 2008/0264916 A1 | 10/2008 | Nagano |
| 2008/0264917 A1 | 10/2008 | White |
| 2008/0264923 A1 | 10/2008 | White |
| 2009/0026188 A1 | 1/2009 | Schorghuber |
| 2009/0039066 A1 | 2/2009 | Centner |
| 2009/0173726 A1 | 7/2009 | Davidson |
| 2010/0059493 A1 | 3/2010 | McAninch |
| 2010/0096373 A1 | 4/2010 | Hillen |

(56) References Cited

U.S. PATENT DOCUMENTS

| | | |
|---|---|---|
| 2010/0096436 A1 | 4/2010 | Nangle |
| 2010/0133250 A1 | 6/2010 | Sardy |
| 2010/0176104 A1 | 7/2010 | Peters |
| 2010/0308026 A1 | 12/2010 | Vogel |
| 2010/0308027 A1 | 12/2010 | Vogel |
| 2010/0314371 A1 | 12/2010 | Davidson |
| 2011/0108527 A1 | 5/2011 | Peters |
| 2011/0114612 A1 | 5/2011 | Holverson |
| 2011/0163080 A1 | 7/2011 | Beck |
| 2011/0204034 A1 | 8/2011 | Schartner |
| 2011/0297658 A1 | 8/2011 | Peters |
| 2011/0248007 A1 | 10/2011 | Takeda |
| 2011/0266269 A1 | 11/2011 | Kachline |
| 2012/0024828 A1 | 2/2012 | Oowaki |
| 2012/0061362 A1 | 3/2012 | Davidson |
| 2012/0074112 A1 | 3/2012 | Kotera |
| 2012/0097655 A1 | 4/2012 | Daniel |
| 2012/0248080 A1 | 10/2012 | Hutchison |
| 2012/0285932 A1 | 11/2012 | Yuan |
| 2012/0291172 A1 | 11/2012 | Wills |
| 2012/0298642 A1 | 11/2012 | Lambert |
| 2013/0112674 A1 | 5/2013 | Mnich |
| 2013/0112676 A1 | 5/2013 | Hutchison |
| 2013/0264323 A1 | 10/2013 | Daniel |
| 2013/0270245 A1 | 10/2013 | Holverson |
| 2014/0008328 A1 | 1/2014 | Enyedy |
| 2014/0008331 A1 | 1/2014 | Ogborn |
| 2014/0008339 A1 | 1/2014 | Ogborn |
| 2014/0008343 A1 | 1/2014 | Ash |
| 2014/0008344 A1 | 1/2014 | Enyedy |
| 2014/0008354 A1 | 1/2014 | Pletcher |
| 2014/0021183 A1 | 1/2014 | Peters |
| 2014/0021186 A1 | 1/2014 | Denney |
| 2014/0021187 A1 | 1/2014 | Denney |
| 2014/0021188 A1 | 1/2014 | Denney |
| 2014/0034621 A1 | 2/2014 | Daniel |
| 2014/0034622 A1 | 2/2014 | Barrett |
| 2014/0035279 A1 | 2/2014 | Narayanan |
| 2014/0042129 A1 | 2/2014 | Daniel |
| 2014/0042138 A1 | 2/2014 | Matthews |
| 2014/0048524 A1 | 2/2014 | Ash |
| 2014/0116994 A1 | 5/2014 | Peters |
| 2014/0131321 A1 | 5/2014 | Enyedy |
| 2014/0158669 A1 | 6/2014 | Davidson |
| 2014/0177109 A1 | 6/2014 | Curtis |
| 2014/0183176 A1 | 7/2014 | Hutchison |
| 2014/0217077 A1 | 8/2014 | Davidson |
| 2014/0251971 A1 | 9/2014 | Hearn |
| 2014/0263193 A1 | 9/2014 | Denney |
| 2014/0263194 A1 | 9/2014 | Narayanan |
| 2014/0263228 A1 | 9/2014 | Peters |
| 2014/0263229 A1 | 9/2014 | Peters |
| 2014/0263230 A1 | 9/2014 | Peters |
| 2014/0263231 A1 | 9/2014 | Peters |
| 2014/0263234 A1 | 9/2014 | Peters |
| 2014/0263237 A1 | 9/2014 | Daniel |
| 2014/0263241 A1 | 9/2014 | Henry |
| 2014/0263243 A1 | 9/2014 | Marschke |
| 2014/0367370 A1 | 12/2014 | Hutchison |
| 2014/0374391 A1 | 12/2014 | Cole |
| 2015/0001184 A1 | 1/2015 | Cole |
| 2015/0001197 A1 | 1/2015 | Marschke |
| 2015/0014283 A1 | 1/2015 | Peters |
| 2015/0028010 A1 | 1/2015 | Peters |
| 2015/0028011 A1 | 1/2015 | Peters |
| 2015/0028012 A1 | 1/2015 | Peters |
| 2015/0083702 A1 | 3/2015 | Scott |
| 2015/0090703 A1 | 4/2015 | Peters |
| 2015/0105898 A1 | 4/2015 | Adams |
| 2015/0151375 A1 | 6/2015 | Peters |
| 2015/0158105 A1 | 6/2015 | Peters |
| 2015/0158106 A1 | 6/2015 | Peters |
| 2015/0158107 A1 | 6/2015 | Latessa |
| 2015/0158108 A1 | 6/2015 | Peters |
| 2015/0183044 A1 | 7/2015 | Peters |
| 2015/0183045 A1 | 7/2015 | Peters |
| 2015/0209889 A1 | 7/2015 | Peters |
| 2015/0209905 A1 | 7/2015 | Matthews |
| 2015/0209906 A1 | 7/2015 | Denney |
| 2015/0209907 A1 | 7/2015 | Narayanan |
| 2015/0209908 A1 | 7/2015 | Peters |
| 2015/0209910 A1 | 7/2015 | Denney |
| 2015/0209913 A1 | 7/2015 | Denney |
| 2015/0251275 A1 | 9/2015 | Denney |
| 2015/0273612 A1 | 10/2015 | Peters |
| 2015/0283638 A1 | 10/2015 | Henry |
| 2015/0283639 A1 | 10/2015 | Henry |
| 2015/0375326 A1* | 12/2015 | Hutchison ............ B23K 9/1056 219/130.01 |
| 2016/0074954 A1 | 3/2016 | Marschke |
| 2016/0144444 A1 | 5/2016 | Davidson |
| 2016/0167151 A1 | 6/2016 | Mehn |
| 2016/0175975 A1 | 6/2016 | Lattner |
| 2016/0199939 A1 | 7/2016 | Hartman |
| 2016/0221105 A1 | 8/2016 | Henry |
| 2016/0288235 A1 | 10/2016 | Davidson |
| 2016/0318112 A1 | 11/2016 | Hutchison |
| 2018/0236585 A1 | 8/2018 | Davidson |

FOREIGN PATENT DOCUMENTS

| | | |
|---|---|---|
| CN | 2125475 | 12/1992 |
| CN | 2181354 | 11/1994 |
| CN | 1298778 | 6/2001 |
| CN | 1496774 | 5/2004 |
| CN | 1600486 | 3/2005 |
| CN | 1640603 | 7/2005 |
| CN | 1712168 | 12/2005 |
| CN | 1714978 | 1/2006 |
| CN | 1836818 | 9/2006 |
| CN | 1871093 | 11/2006 |
| CN | 101062530 | 10/2007 |
| CN | 201098775 | 8/2008 |
| CN | 101376191 | 3/2009 |
| CN | 201249331 | 6/2009 |
| CN | 101804495 | 8/2010 |
| CN | 101862886 | 10/2010 |
| CN | 102470473 | 5/2012 |
| CN | 102554418 | 7/2012 |
| CN | 102596475 | 7/2012 |
| CN | 102770228 | 11/2012 |
| CN | 102825370 | 12/2012 |
| CN | 202824943 | 3/2013 |
| DE | 2501928 | 7/1976 |
| DE | 19808383 | 9/1999 |
| DE | 212004000048 | 6/2006 |
| EP | 0150543 | 8/1985 |
| EP | 0194045 | 9/1986 |
| EP | 0387223 | 9/1990 |
| EP | 0936019 A2 | 8/1999 |
| EP | 0936019 A3 | 3/2001 |
| EP | 1232825 | 8/2002 |
| EP | 2218537 | 8/2010 |
| EP | 2286949 | 2/2011 |
| EP | 2322315 | 5/2011 |
| EP | 2781291 | 10/2015 |
| FR | 1443701 | 6/1966 |
| JP | S5719166 | 2/1982 |
| JP | S57109573 | 7/1982 |
| JP | S583784 | 1/1983 |
| JP | S58119466 | 7/1983 |
| JP | S60108175 | 6/1985 |
| JP | S60108176 | 6/1985 |
| JP | S60170577 | 9/1985 |
| JP | 61186172 | 8/1986 |
| JP | S629773 | 1/1987 |
| JP | S6471575 | 3/1989 |
| JP | H03285768 | 12/1991 |
| JP | H06277840 | 10/1994 |
| JP | H07204848 | 8/1995 |
| JP | H1097327 | 4/1998 |
| JP | H11156542 | 6/1999 |
| JP | 2001276971 | 10/2001 |
| JP | 2003311409 | 11/2003 |

(56) References Cited

FOREIGN PATENT DOCUMENTS

| | | |
|---|---|---|
| JP | 2005034853 | 2/2005 |
| JP | 2006205189 | 8/2006 |
| JP | 2009072814 | 4/2009 |
| JP | 4950819 | 6/2012 |
| JP | 2014176890 | 9/2014 |
| KR | 1020060133016 | 12/2006 |
| KR | 20080009816 | 1/2008 |
| KR | 20100120562 | 11/2010 |
| KR | 1020120027764 | 3/2012 |
| KR | 101497460 | 3/2015 |
| SU | 872102 | 10/1981 |
| WO | 9640465 | 12/1996 |
| WO | 0132347 | 5/2001 |
| WO | 0153030 | 7/2001 |
| WO | 2005030422 | 4/2005 |
| WO | 2014140783 | 9/2014 |
| WO | 2015125008 | 8/2015 |

OTHER PUBLICATIONS

Int'l Search Report and Written Opinion for PCT/US2016/065265 dated Mar. 14, 2017 (16 pages).
International Search Report from PCT Application No. PCT/US2014/055529, dated Mar. 6, 2015, 9 pgs.
International Search Report from PCT application No. PCT/US2013/073863 dated May 2, 2014, 15 pgs.
International Search Report from PCT application No. PCT/US2014/014241 dated May 9, 2014, 8 pgs.
PCT International Search Report & Written Opinion of PCT/US2012/063783 dated Mar. 1, 2013, 12 pages.
International Search Report from PCT application No. PCT/US2013/077710 dated May 9, 2014, 12 pgs.
International Search Report from PCT application No. PCT/US2013/073490 dated May 13, 2014, 10 pgs.
International Search Report from PCT application No. PCT/US2014/017864, dated Aug. 22, 2014, 9 pgs.
International Search Report from PCT application No. PCT/US2014/045872, dated Nov. 4, 2014, 10 pgs.
International Search Report from PCT application No. PCT/US2014/041201, dated Nov. 4, 2014, 11 pg.
International Search Report from PCT application No. PCT/US2015/045715, dated Jan. 7, 2016, 12 pgs.
International Search Report from PCT application No. PCT/US2015/055040, dated Feb. 3, 2016, 11 pgs.
International Search Report from PCT application No. PCT/US2015/056121, dated Apr. 4, 2016, 11 pgs.
International Search Report from PCT application No. PCT/US2016/017385, dated Jul. 19, 2016, 13 pgs.
Bondy et al., "Graph Theory with Applications," Department of Combinatorics and Optimization, University of Waterloo, 1976, p. 7-8.
"ALT 304," Miller—The Power of Blue, Jun. 2001.
"Maxstar 200 SD, DX, and LX," Miller Electric Mfg. Co., Oct. 2003.
Office Action from U.S. Appl. No. 15/498,249 dated Apr. 20, 2018.
Int'l Search Report and Written Opinion for PCT/US2018/035087 dated Sep. 19, 2018 (15 pgs.).
Int'l Search Report and Written Opinion for PCT/US2018/036852 dated Oct. 2, 2018 (17 pgs).
Int'l Search Report and Written Opinion for PCT/US2018/036906 dated Oct. 1, 2018 (15 pgs.).
Int'l Search Report and Written Opinion for PCT/US2018/036914 dated Oct. 2, 2018 (14 pgs.).
Int'l Search Report and Written Opinion for PCT/US2018/036915 dated Oct. 1, 2018 (15 pgs).
Int'l Search Report and Written Opinion for PCT/US2018/036919 dated Oct. 2, 2018 (13 pgs.).

\* cited by examiner

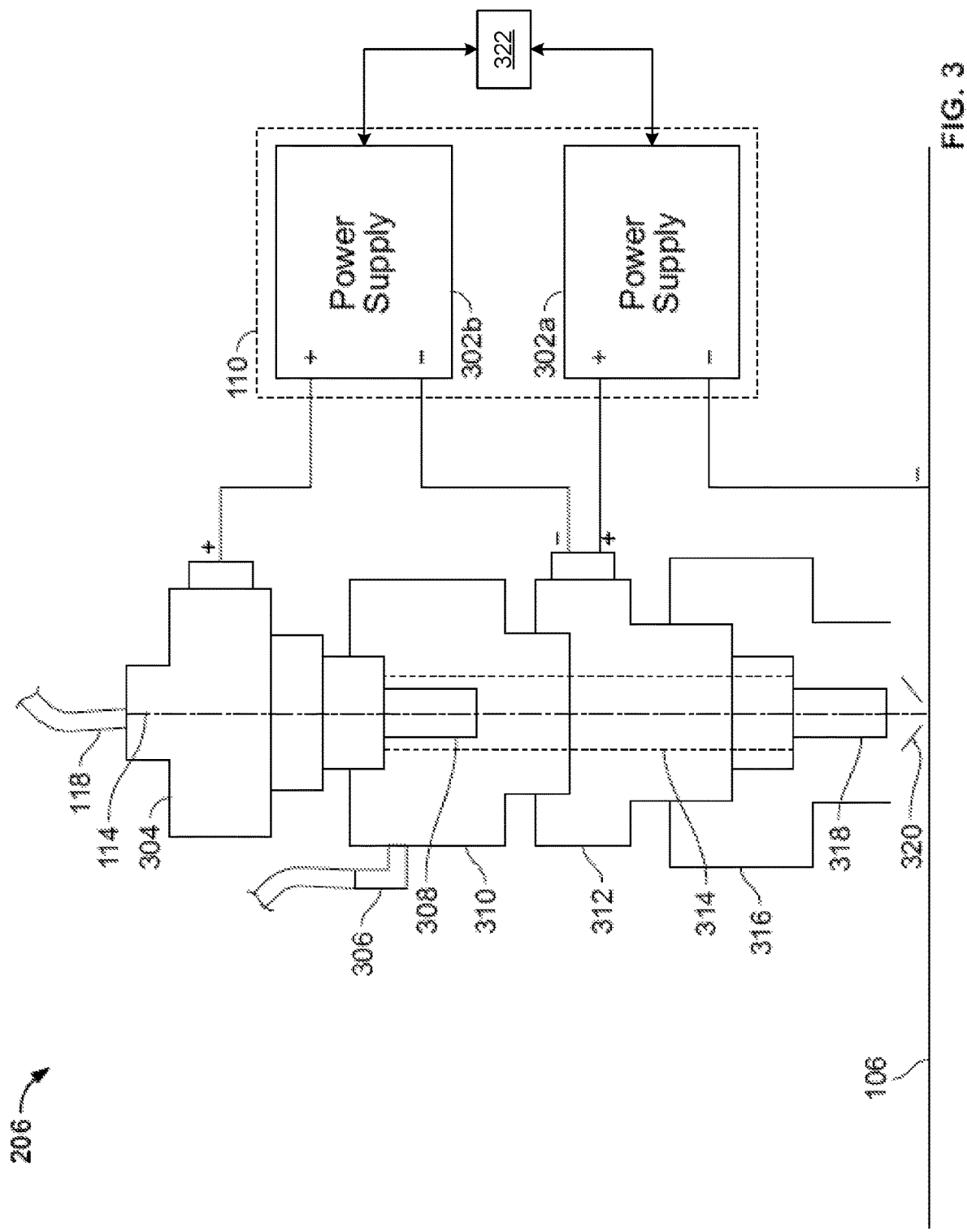

SYSTEMS, METHODS, AND APPARATUS TO PREHEAT WELDING WIRE

BACKGROUND

Welding is a process that has historically been a cost effective joining method. Welding is, at its core, simply a way of bonding two pieces of parent material. A wide range of welding systems and welding control regimes have been implemented for various purposes. In continuous welding operations, metal inert gas (MIG) welding and submerged arc welding (SAW) techniques allow for formation of a continuing weld bead by feeding welding wire shielded by inert gas from a welding torch. Such wire feeding systems are available for other welding systems, such as tungsten inert gas (TIG) welding. Electrical power is applied to the welding wire and a circuit is completed through the workpiece to sustain a welding arc that melts the electrode wire and the workpiece to form the desired weld.

While very effective in many applications, these welding techniques may experience different initial welding performance based upon whether the weld is started with the electrode "cold" or "hot." In general, a cold electrode start may be considered a start in which the electrode tip and adjacent metals are at or relatively near the ambient temperature. Hot electrode starts, by contrast, are typically those in which the electrode tip and adjacent metals are much more elevated, but below the melting point of the electrode wire. In some applications, it is believed that initiation of welding arcs and welds is facilitated when the electrode is hot. However, the current state of the art does not provide regimes designed to ensure that the electrode is heated prior to initiation of a welding operation.

Certain advancements have been made to the process of electrode preheating. For example, U.S. Patent Publication No. 2014/0021183 A1 to Peters describes a welding torch having a contact tip that has electrically isolated upper and lower portions, each portion providing part of the aggregated welding current waveform. Similarly, U.S. Pat. Nos. 4,447,703, 4,547,654, and 4,667,083, as well as PCT Publication No. WO/2005/030422, describe various preheating techniques using a dual contact tip. Despite the foregoing, a need remains for improved welding strategies that allow for welding initiation with a heated electrode wire so as to improve weld performance.

BRIEF SUMMARY

This disclosure relates generally to a wire preheating system, method, and apparatus for use with a welding torch, more particularly, the invention relates to a welding torch that enables continuously fed electrode wire to be preheated for use in various forms of electric welding.

BRIEF DESCRIPTION OF THE DRAWINGS

The features of the present invention will best be understood from a detailed description of the invention and a preferred embodiment thereof selected for the purposes of illustration and shown in the accompanying drawings in which:

FIG. 3 illustrates a functional diagram of an exemplary contact tip assembly.

The figures are not to scale. Where appropriate, the same or similar reference numerals are used in the figures to refer to similar or identical elements.

DETAILED DESCRIPTION

Figure 1:
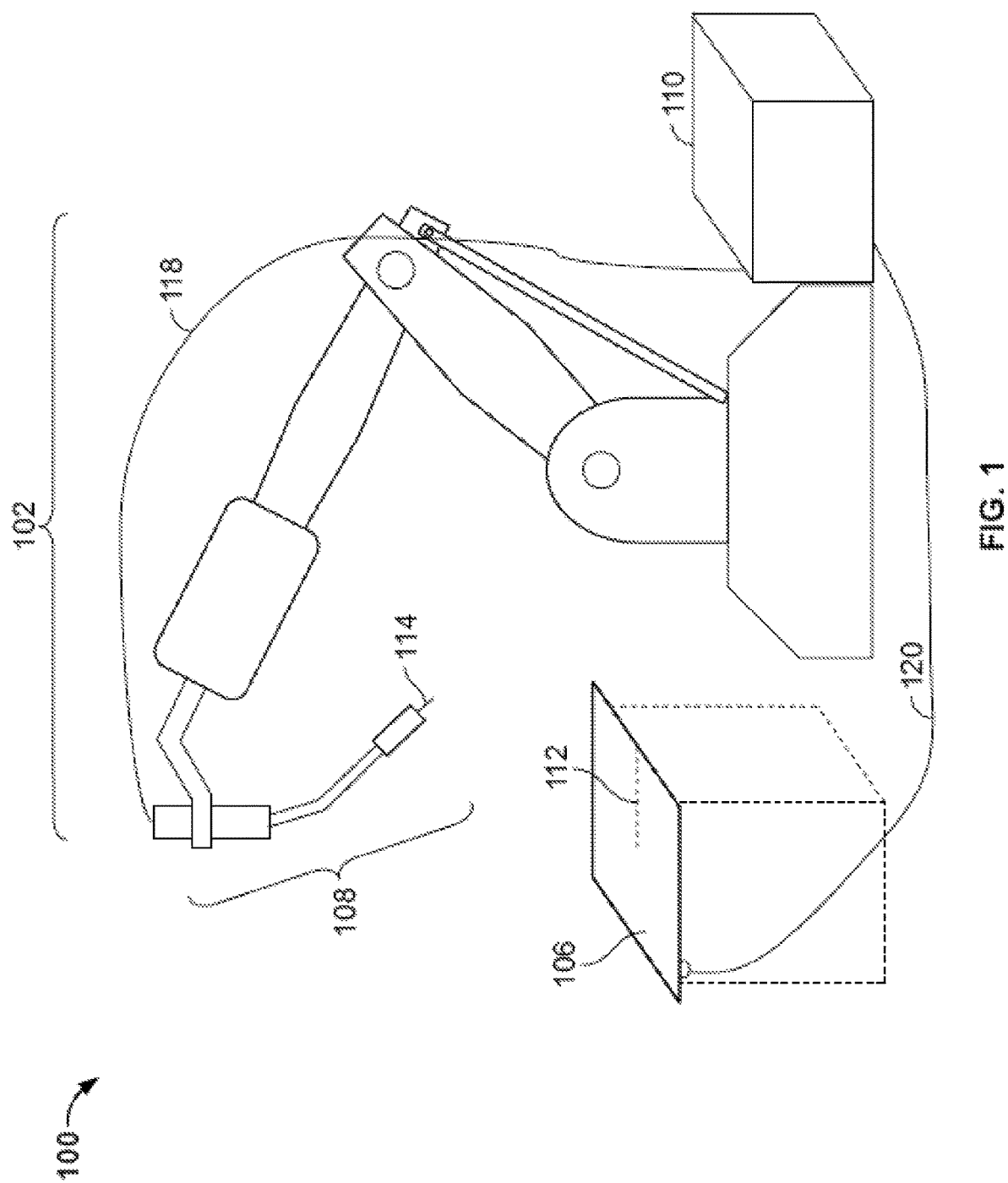
FIG. 1 illustrates an example robotic welding system.

For the purpose of promoting an understanding of the principles of the claimed technology and presenting its currently understood, best mode of operation, reference will be now made to the embodiments illustrated in the drawings and specific language will be used to describe the same. It will nevertheless be understood that no limitation of the scope of the claimed technology is thereby intended, with such alterations and further modifications in the illustrated device and such further applications of the principles of the claimed technology as illustrated therein being contemplated as would typically occur to one skilled in the art to which the claimed technology relates.

As used herein, the word "exemplary" means "serving as an example, instance, or illustration." The embodiments described herein are not limiting, but rather are exemplary only. It should be understood that the described embodiments are not necessarily to be construed as preferred or advantageous over other embodiments. Moreover, the term "embodiments" does not require that all embodiments of the disclosure include the discussed feature, advantage, or mode of operation.

As used herein, a wire-fed welding-type system refers to a system capable of performing welding (e.g., gas metal arc welding (GMAW), gas tungsten arc welding (GTAW), etc.), brazing, cladding, hardfacing, and/or other processes, in which a filler metal is provided by a wire that is fed to a work location, such as an arc or weld puddle.

As used herein, a welding-type power source refers to any device capable of, when power is applied thereto, supplying welding, cladding, plasma cutting, induction heating, laser (including laser welding and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

As used herein, preheating refers to heating the electrode wire prior to a welding arc and/or deposition in the travel path of the electrode wire.

The term "power" is used throughout this specification for convenience, but also includes related measures such as energy, current, voltage, and enthalpy. For example, controlling "power" may involve controlling voltage, current, energy, and/or enthalpy, and/or controlling based on "power" may involve controlling based on voltage, current, energy, and/or enthalpy. Electric power of the kind measured in watts as the product of voltage and current (e.g., V*I power) is referred to herein as "wattage."

Some disclosed examples describe electric currents being conducted "from" and/or "to" locations in circuits and/or power supplies. Similarly, some disclosed examples describe "providing" electric current via one or more paths, which may include one or more conductive or partially conductive elements. The terms "from," "to," and "providing," as used to describe conduction of electric current, do not necessitate the direction or polarity of the current. Instead, these electric currents may be conducted in either direction or have either polarity for a given circuit, even if an example current polarity or direction is provided or illustrated.

Disclosed example consumable electrode-fed welding-type systems include a welding-type power source, an electrode preheating circuit, and an electrode preheating control circuit. The welding-type power source provides welding-type power to a welding-type circuit, where the welding-type circuit includes a welding-type electrode and a first contact tip of a welding torch. The electrode preheating circuit provides preheating power through a first portion of the welding-type electrode via a second contact tip of the welding torch. The electrode preheating control circuit configured to control the preheating power based on a user input specifying the preheating power.

Some example systems further include a user interface to receive a selection of the preheating power, where the electrode preheating control circuit controls the preheating power and the welding-type power based on the selection. In some such examples, the selection includes at least one of a preheating current, a preheating voltage, the preheating power, impedance, or a preheating enthalpy. In some examples, the electrode preheating control circuit limits the selection of the preheating power using at least one of an upper preheating limit or a lower preheating limit.

In some example systems the user interface displays values representing the preheating power and/or the welding-type power and updates the values in response to the selection of the preheating power level. In some such examples, the user interface displays the values with reference to permitted selection ranges of the values.

In some example systems, the user interface displays a value representing at least one of a preheating voltage, a preheating current, a total energy of the preheating power and the welding-type power, or a heat input efficiency, and updates the value in response to the selection of the preheating power. In some examples, the user interface receives a selection of an amount of weld penetration, in which the electrode preheating control circuit controls the preheating power and the welding-type power based on the selection.

In some such examples, the electrode preheating control circuit, in response to an increase in the selected weld penetration, decreases the preheating power and increases the welding-type power. In some examples, the electrode preheating control circuit, in response to a decrease in the selected weld penetration, increases the preheating power and decreases the welding-type power. Some examples further include a penetration sensor configured to detect a weld penetration, in which the electrode preheating control circuit controls the preheating power and the welding-type power to maintain the amount of weld penetration within a threshold range.

In some examples, the electrode preheating control circuit limits the selection of the amount of weld penetration using at least one of an upper penetration limit or a lower penetration limit. In some example systems, the electrode preheating control circuit controls the preheating power based on at least one of a target total heat input for a weld, a travel speed, a target bead width, or a target penetration depth.

In some examples, the electrode preheating control circuit controls a preheating voltage of the preheating power using a first control loop having the user input as an input to the control loop. In some examples, at least one of the electrode preheating control circuit or a welding control circuit controls the welding-type power based on the preheating power. In some examples, the user input specifies the preheating power as at least one of: a ratio based on at least one of the preheating power, a voltage of the preheating power, a current of the preheating power, or an impedance of the first portion of the welding-type electrode, and based on at least one of the welding-type power, a voltage of the welding-type power, a current of the welding-type power, or an arc impedance.

Some example systems further include a display device to display a balance between the preheating power and the welding-type power based on the user input, display a total heat input of the preheating power and the welding-type power, and update the displays of the balance and the total heat input in response to a change in the user input. In some examples, the electrode preheating circuit is configured to provide preheating power via the second contact tip and the first contact tip. In some examples, the electrode preheating circuit is configured to provide preheating power via the second contact tip and a third contact tip.

Disclosed example consumable electrode-fed welding-type systems include a welding type power source, an electrode preheating circuit, and an electrode preheating control circuit. The welding-type power source provides welding-type power to a welding-type circuit based on a first control loop, in which the welding-type circuit includes a welding-type electrode and a first contact tip of a welding torch. The electrode preheating circuit provides preheating power through a first portion of the welding-type electrode via a second contact tip of the welding torch. The electrode preheating control circuit controls the preheating power based on a second control loop having a user input specifying at least one of a target heat input, a target preheating power level, a target ratio between the preheating power and the welding-type power, or a target arc penetration, the first control loop being responsive to the preheating power.

Disclosed example methods include determining, via a control circuit, a target preheating power level based on a user input specifying at least one of a target heat input, a target preheating power level, a target ratio between the preheating power and the welding-type power, or a target weld penetration. The methods further include controlling, via the control circuit, delivery of preheating power through a first portion of a welding-type electrode via first and second contact tips of a welding torch based on the user input. The methods further include controlling, via the control circuit, delivery of welding power to the welding-type electrode via the first contact tip based on the preheating power. The example methods also include controlling, via the control circuit, a user interface device to display at least one of a voltage of the preheating power, a current of the preheating power, a heat input of the preheating power, a heat input of the welding-type power, or a total heat input of the preheating power and the welding power.

Referring to FIG. 1, an example welding system 100 is shown in which a robot 102 is used to weld a workpiece 106 using a welding tool 108, such as the illustrated bent-neck (i.e., gooseneck design) welding torch (or, when under manual control, a handheld torch), to which power is delivered by welding equipment 110 via conduit 118 and returned by way of a ground conduit 120. The welding equipment 110 may comprise, inter alia, one or more power sources (each generally referred to herein as a "power supply"), a source of a shield gas, a wire feeder, and other devices. Other devices may include, for example, water coolers, fume extraction devices, one or more controllers, sensors, user interfaces, communication devices (wired and/or wireless), etc.

The welding system 100 of FIG. 1 may form a weld (e.g., at weld joint 112) between two components in a weldment by any known electric welding techniques. Known electric welding techniques include, inter alia, shielded metal arc welding (SMAW), MIG, flux-cored arc welding (FCAW), TIG, laser welding, sub-arc welding (SAW), stud welding, friction stir welding, and resistance welding. MIG, TIG, hot wire cladding, hot wire TIG, hot wire brazing, multiple arc applications, and SAW welding techniques, inter alia, may involve automated or semi-automated external metal filler (e.g., via a wire feeder). In multiple arc applications (e.g., open arc or sub-arc), the preheater may preheat the wire into a pool with an arc between the wire and the pool. Optionally, in any embodiment, the welding equipment 110 may be arc welding equipment having one or more power supplies, and associated circuitry, that provides a direct current (DC), alternating current (AC), or a combination thereof to an electrode wire 114 of a welding tool (e.g., welding tool 108). The welding tool 108 may be, for example, a TIG torch, a MIG torch, or a flux cored torch (commonly called a MIG "gun"). The electrode wire 114 may be tubular-type electrode, a solid type wire, a flux-core wire, a seamless metal core wire, and/or any other type of electrode wire.

As will be discussed below, the welding tool 108 may employ a contact tip assembly 206 that heats the electrode wire 114 prior to forming a welding arc 320 using the electrode wire 114. Suitable electrode wire 114 types includes, for example, tubular wire, metal cored wire, aluminum wire, solid gas metal arc welding (GMAW) wire, gas-shielded FCAW wire, SAW wire, self-shielded wire, etc. In one aspect, the electrode wire 114 may employ a combination of tubular wire and reverse polarity current, which increases the metal transfer stability by changing it from globular transfer to a streaming spray. By preheating prior to wire exiting the first tip and fed in the arc (where the material transfer takes place), the tubular electrode wire 114 acts more like a solid wire in that the material transfer is a more uniform spray or streaming spray. Moreover, there is a reduction in out-gassing events and very fine spatter-causing events, which are normally seen while welding with metal core wire. Such a configuration enables the tubular wire to function in a manner similar to a solid wire type streaming spray. Yet another benefit of preheating is alleviating wire flip due to poor wire cast and helix control in wire manufacturing (which may be more pronounced in seamed tubular wire than solid wire) because the undesired wire twist will be reduced in the preheating section.

Figure 2A:
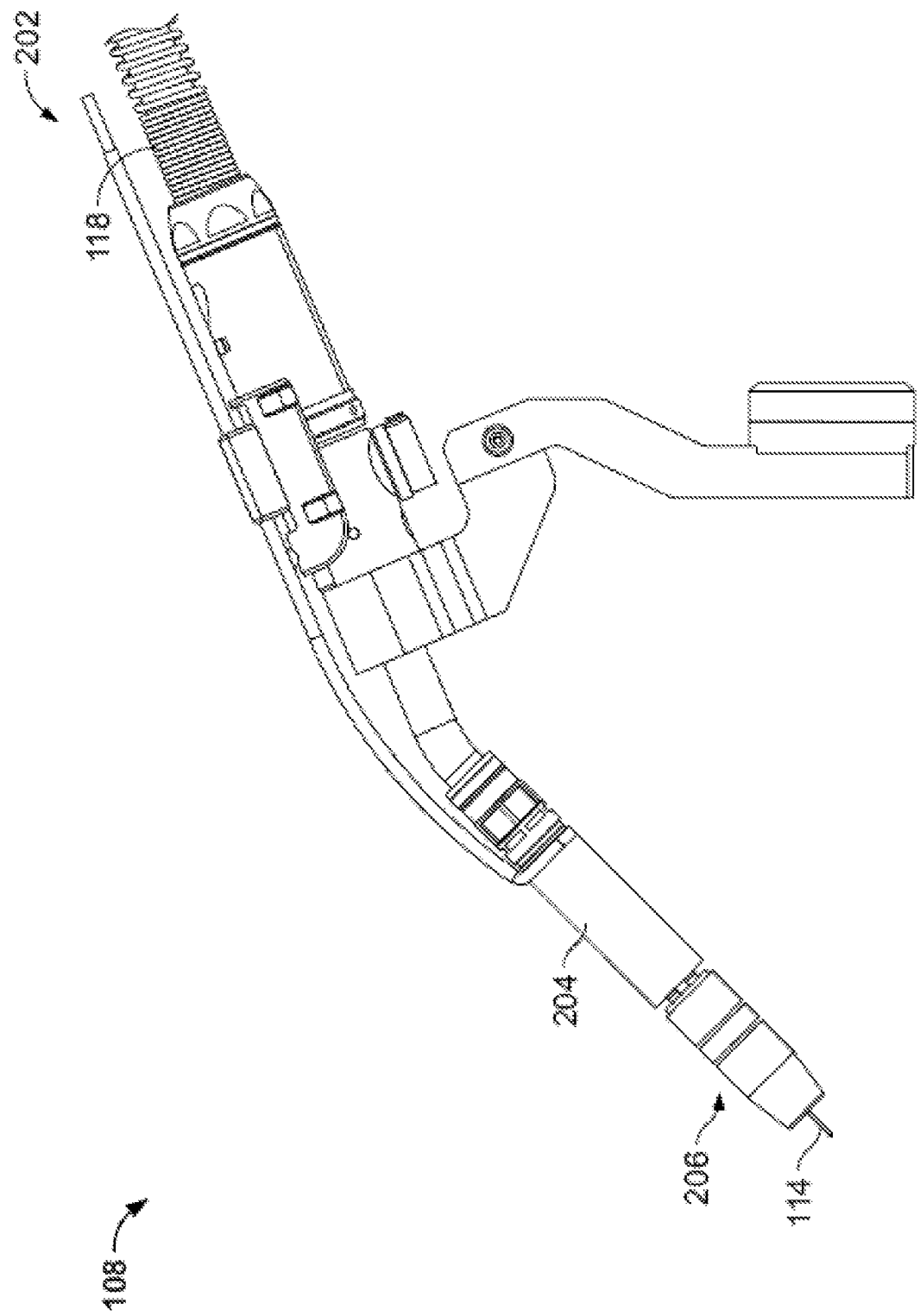
FIG. 2a illustrates a side view of an example robotic gooseneck welding torch with an air cooled preheater section.
Figure 2B:
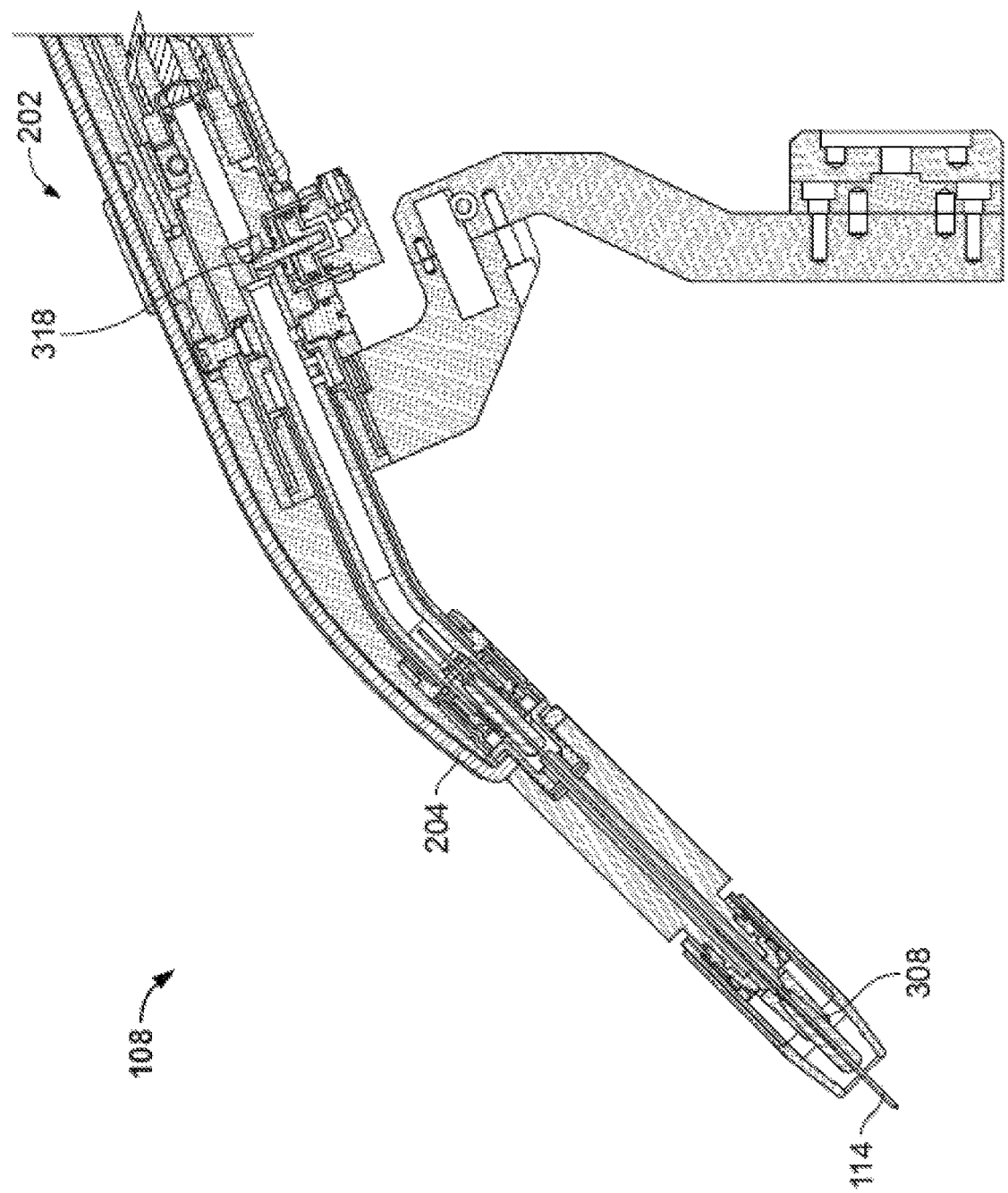
FIG. 2b illustrates a cross sectional side view of an example robotic gooseneck welding torch with an air cooled preheater section.
Figure 2C:
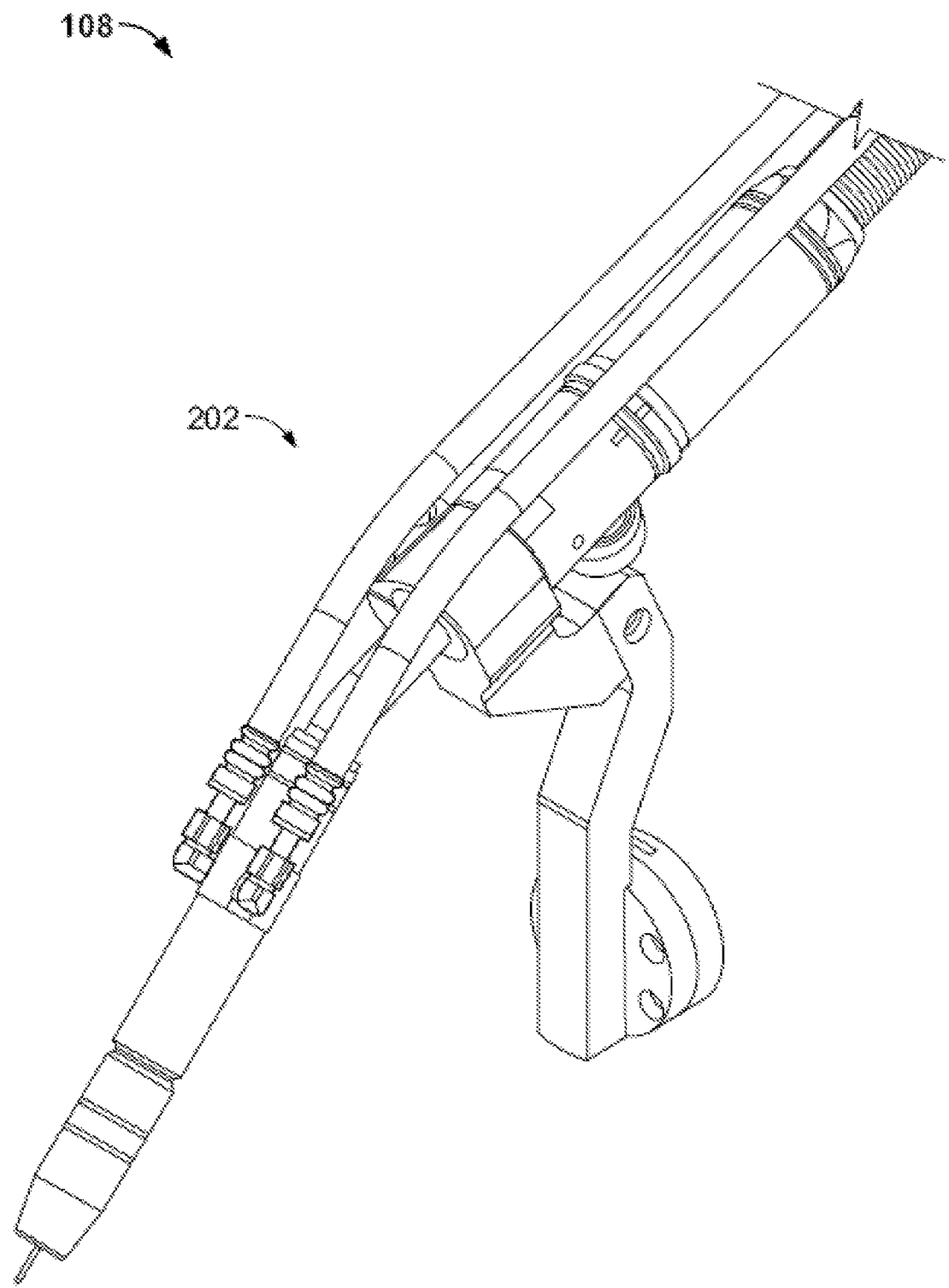
FIG. 2c illustrates a perspective view of an example robotic gooseneck welding torch with liquid cooled weld cables.
Figure 2D:
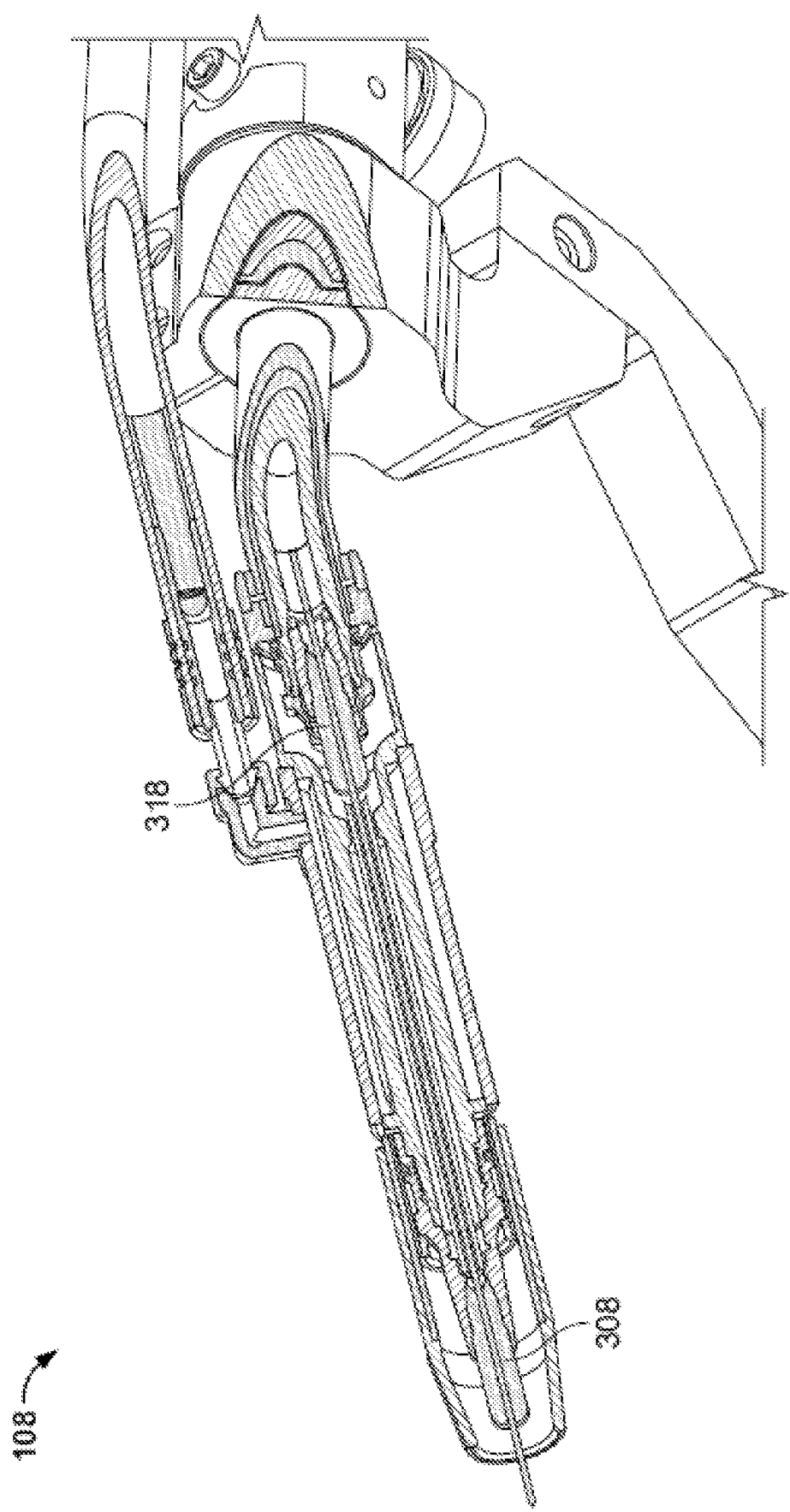
FIG. 2d illustrates a cross sectional perspective view of an example robotic gooseneck welding torch with liquid cooled weld cables.

As will be discussed with regard to FIG. 2a through 2d, the welding tool 108 may be a gooseneck torch, such as those used with robotic welding, but other shapes are contemplated, including virtually any neck bend angle greater than zero, handheld versions for low hydrogen FCAW welding, handhelds for GMAW, straight-neck hard automation torches, straight-neck SAW torches, etc. FIG. 2a illustrates a side view of an example robotic gooseneck welding torch with an air cooled preheater section. FIG. 2b illustrates a cross sectional side view of an example robotic gooseneck welding torch with an air cooled preheater section. FIG. 2c illustrates a perspective view of an example robotic gooseneck welding torch with liquid cooled weld cables. FIG. 2d illustrates a cross sectional perspective view of an example robotic gooseneck welding torch with liquid cooled weld cables, where the copper conductor partially shown. In certain aspects, a plurality of ceramic guides or rollers may be used to provide a preheater with a bend in it, which might have contact advantages with the contact tips and allow for unique form factors. In other aspects, the neck may be straight and the robot mounting bracket has the bend.

There are, however, a number of advantages to the gooseneck torch design. The gooseneck torch design, for example, allows for better access to the weld joint 112, as well as automation capabilities in heavy equipment applications. The gooseneck torch design also allows for heavier deposition welding in tighter spaces compared to, for example, a tandem torch design. Thus, in operation, the electrode wire 114 delivers the welding current to the point of welding (e.g., the weld joint 112) on the workpiece 106 (e.g., a weldment) to form a welding arc 320.

In the welding system 100, the robot 102, which is operatively coupled to welding equipment 110 via conduit 118 and ground conduit 120, controls the location of the welding tool 108 and operation of the electrode wire 114 (e.g., via a wire feeder) by manipulating the welding tool 108 and triggering the starting and stopping of the current flow (whether a preheat current and/or welding current) to the electrode wire 114 by sending, for example, a trigger signal to the welding equipment 110. When welding current is flowing, a welding arc 320 is developed between the electrode wire 114 and the workpiece 106, which ultimately produces a weldment. The conduit 118 and the electrode wire 114 thus deliver welding current and voltage sufficient to create the electric welding arc 320 between the electrode wire 114 and the workpiece 106. At the point of welding between the electrode wire 114 and the workpiece 106, the welding arc 320 locally melts the workpiece 106 and electrode wire 114 supplied to the weld joint 112, thereby forming a weld joint 112 when the metal cools.

In certain aspects, in lieu of a robot 102's robotic arm, a human operator may control the location and operation of the electrode wire 114. For example, an operator wearing welding headwear and welding a workpiece 106 using a handheld torch to which power is delivered by welding equipment 110 via conduit 118. In operation, as with the system 100 of FIG. 1, an electrode wire 114 delivers the current to the point of welding on the workpiece 106 (e.g., a weldment). The operator, however, could control the location and operation of the electrode wire 114 by manipulating the handheld torch and triggering the starting and stopping of the current flow via, for example, a trigger. A handheld torch generally comprises a handle, a trigger, a conductor tube, a nozzle at the distal end of the conductor tube, and, as disclosed herein, a contact tip assembly 206. Applying pressure to the trigger (i.e., actuating the trigger) initiates the welding process by sending a trigger signal to the welding equipment 110, whereby welding current is provided, and the wire feeder is activated as needed (e.g., to drive the electrode wire 114 forward to feed the electrode wire 114 and in reverse to retract the electrode wire 114). Commonly owned U.S. Pat. No. 6,858,818 to Craig S. Knoener, for example, describes an example system and method of controlling a wire feeder of a welding-type system. The subject disclosure may be practiced together with spin arc and reciprocating wire feed. In one example, the bottom tip may be moved to cause a preheated wire to spin. In another example, the wire may be moved axially forward and backward prior to be preheated by reverse wire feed motor upstream. Both spin and reverse wire feed on its own may have a positive effect in wire melt off rate and deposition. When they are combined, the effect on deposition rate may be compounded.

FIG. 2A illustrates a perspective view of an example robotic gooseneck welding torch 108. The illustrated gooseneck torch 108 generally includes a torch body 202, a gooseneck 204 extending from a forward end of the torch body 202, and a contact tip assembly 206 at a distal end of the gooseneck 204, or through the radius of the gooseneck 204. The conduit 118 of the welding system 100 operably couples to a rear end of the torch body 202, which is further operably coupled to the robot 102 and welding equipment 110. The conduit 118 supplies, inter alia, electrical current, shielding gas, and a consumable electrode (e.g., electrode wire 114) to the torch body 202. The electrical current, shielding gas, and consumable electrode travel through the torch body 202 to the gooseneck 204 and ultimately exit through an orifice at the distal end of the contact tip assembly 206 where a welding arc 320 is ultimately formed. In certain aspects, gooseneck torch 108 may be fluid cooled, such as air-cooled and/or liquid-cooled (e.g., water-cooled). In one embodiment, the liquid cooling mechanism surrounds the preheat contact tips and transfers away extra heat from the preheater inside the torch body.

To facilitate maintenance, the gooseneck torch 108 may be configured with interchangeable parts and consumables. For example, the gooseneck torch 108 may include a quick change add on and/or a second contact tip that allows adaptation of an existing water cooled/air cooled torch. Commonly owned U.S. Patent Publication No. 2010/0012637, for example, discloses a suitable gooseneck locking mechanism for a robotic torch having a torch body and a gooseneck that includes a connector receiver disposed in the torch body.

The packaging of power source for preheat can take one of a variety of forms. In a preferred aspect, the preheat power supply may be integral with the welding power supply, or inside the same housing. Inside the same box, the preheat power supply can be an auxiliary power supply with its own separate transformer feeding from the mains; however, it is also possible for the preheat power supply to share the same primary and iron core of transformer for welding current by feeding off a dedicated secondary winding. An integrated box provides simplicity in inter-connection, installation and service. Another embodiment is that the preheat power supply is separately packaged in its own housing with benefit of retrofitting into existing installations and to permit a "mix-and-match" flexibility in pairing with other power sources, such as for those suitable for open arc welding and sub-arc welding. Separate packaging also requires communications between the controller inside the welding power source and the preheating power source. Communication may be provided through digital networking, or more specifically industrial serial bus, CANbus, or Ethernet/IP. Separate packaging may also result in combining the power output of preheat power source and the output of the welding power source, possibly in the feeder, or in a junction box before the torch, or in the torch itself.

In open arc welding, there are two derivatives, high deposition welding commonly seen in shipbuilding and heavy equipment fabrication (commonly groove, butt and fillet joint, 15-40 ipm travel speed); and high speed welding commonly seen in automotive (commonly lap joint, 70-120 ipm travel speed). Wire preheating improves deposition and/or travel speed in both cases. In open arc, GMAW with solid or metal core wire may be used; or FCAW with fluxed cored wire may be used as a process. In sub-arc welding, solid or metal core wire may be used. In both open arc and sub-arc, multiple wire and/or arc combination is possible. For example, the lead wire has preheat and arc, but the trail wire has only preheat but no arc. Another example is that both lead wire and trail wire has preheat and arc. Yet another example is that there are 3 wires, where the first and third wire has both preheat and arc, but the middle wire has preheat only but no arc. There are many permutations possible. The third group of applications is resistive preheating with another non-consumable heat source such as laser, plasma, or TIG, for welding, brazing, cladding, and hardfacing. The wire is preheated by resistive preheat and fed into a liquid puddle melted by laser, plasma, or TIG.

In some examples, the second contact tip (e.g., further from the arc) is a spring loaded, one-size-fits-all contact tip. The spring pressure in the second contact tip improves electrical contact despite electrical erosion and/or mechanical wear on the contact tip. Conventional spring loaded contact tips are relatively expensive and are easily damaged by exposure to the arc and/or burn-back. However, using the spring loaded second contact tip that is not exposed to the arc and is not exposed to burn-back improves the longevity of the spring loaded contact tip. Because the torch accommodates different wire sizes, and a multi-size or universal second tip improves convenience to the weld operator by reducing the number of tips to be matched to the wire diameter, (e.g., the first contact tip). The construction of the spring-loaded contact tip may be one piece (e.g., a tubular structure with slots so that the tines are adaptive to different wire diameter and apply pressure and reliable contact) or two or more pieces. For weld operators who are accustomed to conventional guns and only having a single contact tip (e.g., the tip closer to the arc), the weld operator is rarely or never required to replace the second contact tip, thereby improving the weld operator experience using multiple contact tips.

FIG. 3 illustrates a functional diagram of an exemplary contact tip assembly 206, which may be used with welding system 100, whether robotic or manually operated. As illustrated, the contact tip assembly 206 may comprise a first body portion 304, a gas shielding inlet 306, a first contact tip 318, a second body portion 310, a third body portion 312, a ceramic guide 314, a gas nozzle 316, and a second contact tip 308. While the first, second, and third body portions 304, 310, 312 are illustrated as separate components, one of skill in the art, having reviewed the present disclosure, would recognize that one or more of said body portions 304, 310, 312 may be fabricated as a single component. In certain aspects, the contact tip assembly 206 may be added to an existing welding torch. For example, the contact tip assembly 206 can be attached to a distal end of a standard welding setup and then used for resistive preheating. Similarly, the contact tip assembly 206 may be provided as a PLC retrofit with custom software, thereby enabling integration with existing systems that already have power sources and feeders.

In some examples, the first contact tip 318 and/or the second contact tip 308 are modular and/or removable so as to be easily serviceable by a user of the welding system 100. For example, the first contact tip 318 and/or the second contact tip 308 may be implemented as replaceable cartridges. In some examples, the welding equipment 110 monitors identifies one or more indicators that the first contact tip 318 and/or the second contact tip 308 should be replaced, such as measurements of the used time of the first contact tip 318 and/or the second contact tip 308, temperature(s) of the first contact tip 318 and/or the second contact tip 308, amperage in the first contact tip 318 and/or the second contact tip 308 and/or the wire, voltage between the first contact tip 318 and/or the second contact tip 308 and/or the wire, enthalpy or heat content to heat a given volume of wire to a fraction of its melting point upon exiting the first contact tip 318, and/or any other data.

In operation, the electrode wire 114 passes from the gooseneck 204 through a first contact tip 318 and a second contact tip 308, between which a second power supply 302b generates a preheat current to heat the electrode wire 114. Specifically, the preheat current enters the electrode wire 114 via the second contact tip 308 and exits via the first contact tip 318. At the first contact tip 318, a welding current may also enter the electrode wire 114. The welding current is generated, or otherwise provided by, a first power supply 302a. The welding current exits the electrode wire 114 via the workpiece 106, which in turn generates the welding arc 320. That is, the electrode wire 114, when energized for welding via a welding current, carries a high electrical potential. When an arc is established between the electrode wire 114 and a target metal workpiece 106, an electrical circuit is completed and the welding current flows through the electrode wire 114, through the arc 320, and across the metal work piece(s) 106. The welding current causes the electrode wire 114 and the work piece(s) 106 to melt, thereby joining the work pieces as the melt solidifies. By preheating the electrode wire 114, a welding arc 320 may be generated with drastically reduced arc energy. The preheat current can range from, for example, 75 A to 400 A, when the distance between contact tips is 5.5 inches. Generally speaking, the preheat current is proportional to the distance between the two contact tips and the electrode wire 114 size. That is, the smaller the distance, the more current needed. The preheat current may flow in either direction between the electrodes.

The example power supplies 302a, 302b of FIG. 3 are controlled by an electrode preheating control circuit 322. As described in more detail below, the electrode preheating control circuit 322 controls the welding power and/or the preheating power output by the power supplies 302a, 302b based on a user input specifying the preheating power.

To avoid unwanted kinking, buckling, or jamming of the electrode wire 114, a guide 314 may be provided to guide the electrode wire 114 as it travels from the second contact tip 308 to the first contact tip 318. The guide 314 may be fabricated from ceramic, a dielectric material, a glass-ceramic polycrystalline material, and/or another non-conductive material. The contact tip assembly 206 may further comprise a spring loaded device, or equivalent device, that reduces wire kinking, buckling, and jamming, while increasing wire contact efficiency by keeping the electrode wire 114 taught and/or straight.

In certain aspects, the second contact tip may be positioned at the wire feeder (e.g., at welding equipment 110) or another extended distance, to introduce the preheat current, in which case the preheat current may exit a contact tip in the gooseneck torch 108. The contact tip in the gooseneck torch 108 may be the same, or different, from the contact tip where the welding current is introduced to the electrode wire 114. The preheat contact tip(s) may be further positioned along the electrode wire 114 to facilitate use with Push-Pull Guns, such as those available from Miller Electric of Appleton, Wis. The liner could be made from ceramic rollers so the preheat current could be injected back at the feeder and be a very low value due to the length of the liner.

The welding current is generated, or otherwise provided by, a first power supply 302a, while the preheat current is generated, or otherwise provided by, a second power supply 302b. The first power supply 302a and the second power supply 302b may ultimately share a common power source (e.g., a common generator or line current connection), but the current from the common power source is converted, inverted, and/or regulated to yield the two separate currents—the preheat current and the welding current. For instance, the preheat operation may be facilitated with a single power source and associated converter circuitry. In which case, three leads may extend from the welding equipment 110 or an auxiliary power line in the welder, which could eliminate the need for the second power supply 302b.

In certain aspects, in lieu of a distinct contact tip assembly 206, the first contact tip 318 and a second contact tip 308 may be positioned on each side of the gooseneck bend. For example, as illustrated by FIG. 2b, a preheat section may be curved (e.g., non-straight). That is, wire is fed through a section of the torch that has a bend greater than 0 degrees or a neck that would be considered a "gooseneck". The second contact tip 308 may be positioned before the initial bend and the first contact tip 318 after the bend is complete. Such an arrangement may add the benefit to the connectivity of the heated wire moving through the portion of the neck between the two contact tips. Such an arrangement results in a more reliable connection between the two contact tips where an off axis, machined dielectric insert was previously needed.

The preheat current and welding current may be DC, AC, or a combination thereof. For example, the welding current may be AC, while the preheat current may be DC, or vice versa. Similarly, the welding current may be DC electrode negative (DCEN) or a variety of other power schemes. In certain aspects, the welding current waveform may be further controlled, including constant voltage, constant current, and/or pulsed (e.g., AccuPulse). In certain aspects, constant voltage and/or constant power, constant penetration, and/or constant enthalpy may be used to facilitate preheat instead of constant current. For example, it may be desirable to control the amount of penetration into the workpiece. In certain aspects, there may be variations in contact tip to work distances that under constant voltage weld processes will increase or decrease the weld current in order to maintain a voltage at or close to the target voltage command, and thus changing the amount of penetration/heat input into the weld piece. By adjusting the amount of preheat current in response to changes to contact tip to work changes the penetration/heat input can be advantageously controlled. Furthermore, penetration can be changed to reflect a desired weld bead/penetration profile. For example, the preheat current may be changed into a plurality of waveforms, such as, but not limited to, a pulse type waveform to achieve the desired weld bead/penetration profile.

The current could be line frequency AC delivered from a simple transformer with primary phase control. Controlling the current and voltage delivered to the preheat section may be simpler using a CC, CV, or constant power depending on how the control is implemented as well as the power supply configuration to do it. In another aspect, the welding power source for consumable arc welding (GMAW and SAW) may include regulating a constant welding current output and adapt wire speed to maintain arc length or arc voltage set-point (e.g., CC+V process control). In yet another aspect, the welding power source may include regulating a constant welding voltage output (or arc length) and adapt wire speed to maintain arc current set-point (e.g., CV+C process control). The CC+V and CV+C process controls allow for accommodation of wire stick-out variation and preheat current/temperature variation by adapting wire feed speed (or variable deposition). In yet another aspect, the power source may include regulating a constant welding current output, the feeder maintains constant deposition, and the preheat power source adapts preheat current (or preheat power) to maintain constant arc voltage (or arc length). It can be appreciated that the addition of preheat current/power adds a new degree of freedom to the wire welding processes (GMAW and SAW) that allows flexibility and controllability in maintaining constant weld penetration and weld width (arc current), deposition (wire speed) and process stability (arc length or voltage). These control schemes may be switched during the welding process, for example, CV+C for arc start only, and other control schemes for the main weld.

Using an advanced controlled welding waveform allows for the reduction in heat input, distortion, and improvements in bead geometry at high deposition rates. Thus, expanding the operating range of pulse welding, reducing rotational transfer at high deposition rates, and reducing spatter caused by rotational spray. By preheating the electrode wire 114, the operating range for pulse programs can be extended to higher depositions. This is possible because of the lower power that is needed to transfer the material at those deposition rates. Before, the pulse width/frequency/peak amperage were too high at higher deposition rates, that the benefits of pulsing were no longer present. By preheating the electrode wire 114, the operator is able to use similar pulse programs for higher rates (e.g., 600 inches per minute (ipm)), which was previously only available at slower rates, such as 300 ipm. Preheating the electrode wire 114 also maximizes the benefit for pulse welding with low background current. Furthermore, using a metal core with a custom pulse configuration in combination with the contact tip assembly 206 allows for heavier deposition welding at a higher quality. By preheating the electrode wire 114, it behaves similarly to a solid wire and its transfer style.

Additionally or alternatively, preheating the electrode wire 114 enables the background current of the pulse waveform to be reduced substantially, as its primary function may be changed from growing a ball to merely sustaining an arc between the electrode wire 114 and the workpiece 106. Conventionally, the background current of the pulse waveform is used to grow the droplet or ball, which is subsequently deposited to the workpiece 106. The example power supply 302a may implement the pulse waveform based on the preheating power applied to the electrode wire 114 by the preheat power supply 302b.

The welding system 100 may be configured to monitor the exit temperature of the electrode wire 114 between the preheat contact tips (e.g., the preheat temperature), as illustrated, between the first contact tip 318 and the second contact tip 308. The preheat temperature may be monitored using one or more temperature determining devices, such as a thermometer, positioned adjacent the electrode wire 114, or otherwise operably positioned, to facilitate periodic or real-time welding feedback. Example thermometers may include both contact sensors and non-contact sensors, such as non-contact infrared temperature sensors, thermistors, and/or thermocouples. An infrared thermometer determines temperature from a portion of the thermal radiation emitted by the electrode wire 114 to yield a measured preheat temperature. The temperature determining device may, in addition to or in lieu of the thermometers, comprise one or more sensors and/or algorithms that calculate the preheat temperature of the electrode wire 114. For example, the system may dynamically calculate temperature based on, for example, a current or voltage. In certain aspects, the thermometer may measure the temperature of the dielectric guide or first contact tip to infer the wire temperature.

In operation, the operator may set a target predetermined preheat temperature whereby the welding system 100 dynamically monitors the preheat temperature of the electrode wire 114 and adjusts the preheat current via the second power supply 102b to compensate for any deviation (or other difference) of the measured preheat temperature from the target predetermined preheat temperature. Similarly, controls may be set such that a welding operation cannot be performed until the electrode wire 114 has been preheated to the predetermined preheat temperature.

Figure 4C:
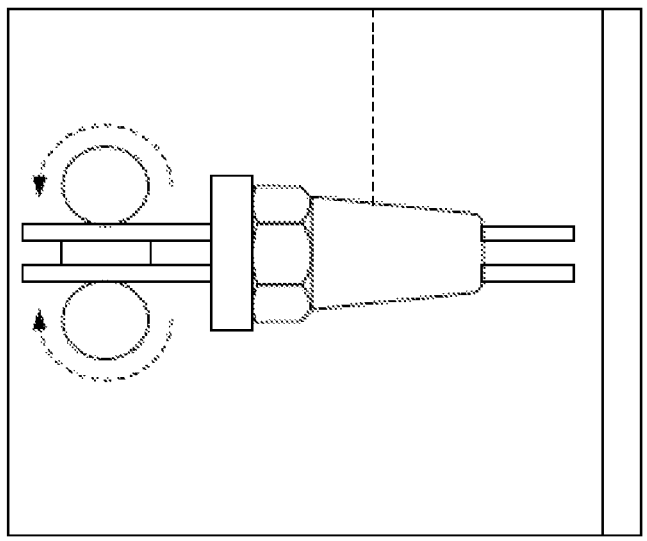
FIGS. 4a, 4b, and 4c illustrate example preheat torch wire configurations.
Figure 4B:
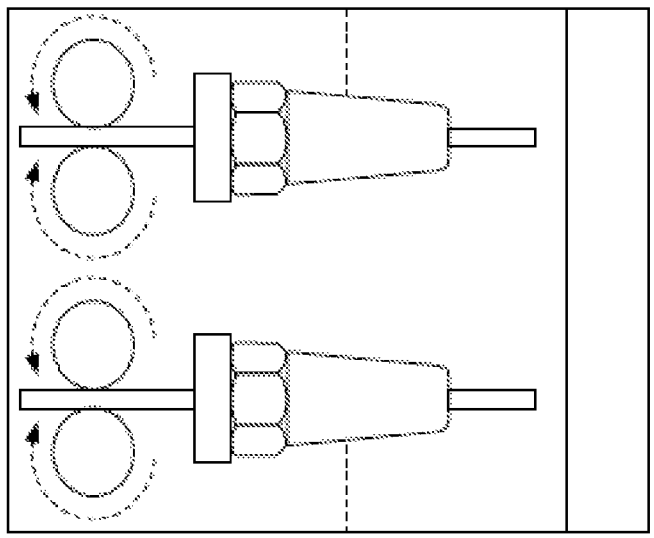
Figure 4A:
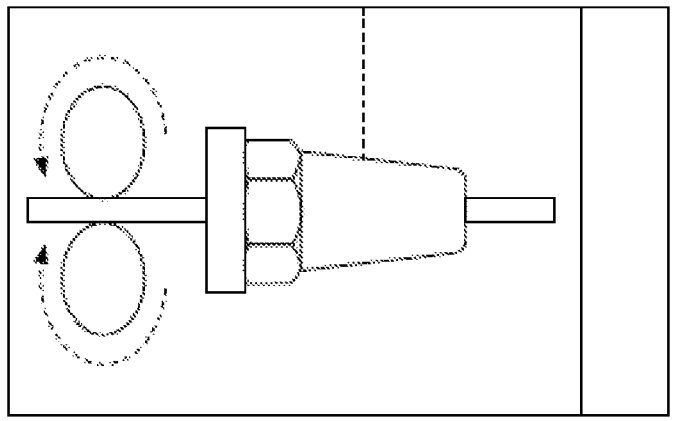

As illustrated in FIGS. 4a through 4c, the preheat torch can be used in combination with a submerged arc power supply in a single preheated wire, a tandem preheated wire (two power sources), and/or a twin preheated wire configuration (one power source). For example, FIG. 4a illustrates a submerged arc (SAW) power supply in a single preheated wire configuration. The wire may be preheated with CV AC, CV EP, CV EN, CV+C AC, CV+C EP, CV+C EN, CC AC, CC EP, CC EN, CC+V AC, CC+V EP, and/or CC+V EN. FIG. 4b illustrates a submerged arc power supply in a tandem preheated wire configuration. Wire could be used in a standard SAW configuration or any variation of the previously mentioned. The wire may be preheated with CV AC, CV EP, CV EN, CV+C AC, CV+C EP, CV+C EN, CC AC, CC EP, CC EN, CC+V AC, CC+V EP, and/or CC+V EN. In certain aspects, 1 wire may be preheated and one normal (Front-Back wires). Moreover, different polarity combinations may be employed for each wire (EP, EN, AC, CV+C, CC+V). One example tandem SAW configuration in FIG. 4b for certain applications is that the lead arc is DCEP on unheated solid wire for penetration, and the trail arc is DCEN on resistively preheated metal core wire for deposition. Finally, FIG. 4c illustrates a submerged arc power supply in a single preheated wire configuration. The wire may be preheated with CV AC, CV EP, CV EN, CV+C AC, CV+C EP, CV+C EN, CC AC, CC EP, CC EN, CC+V AC, CC+V EP, and/or CC+V EN.

Figure 5:
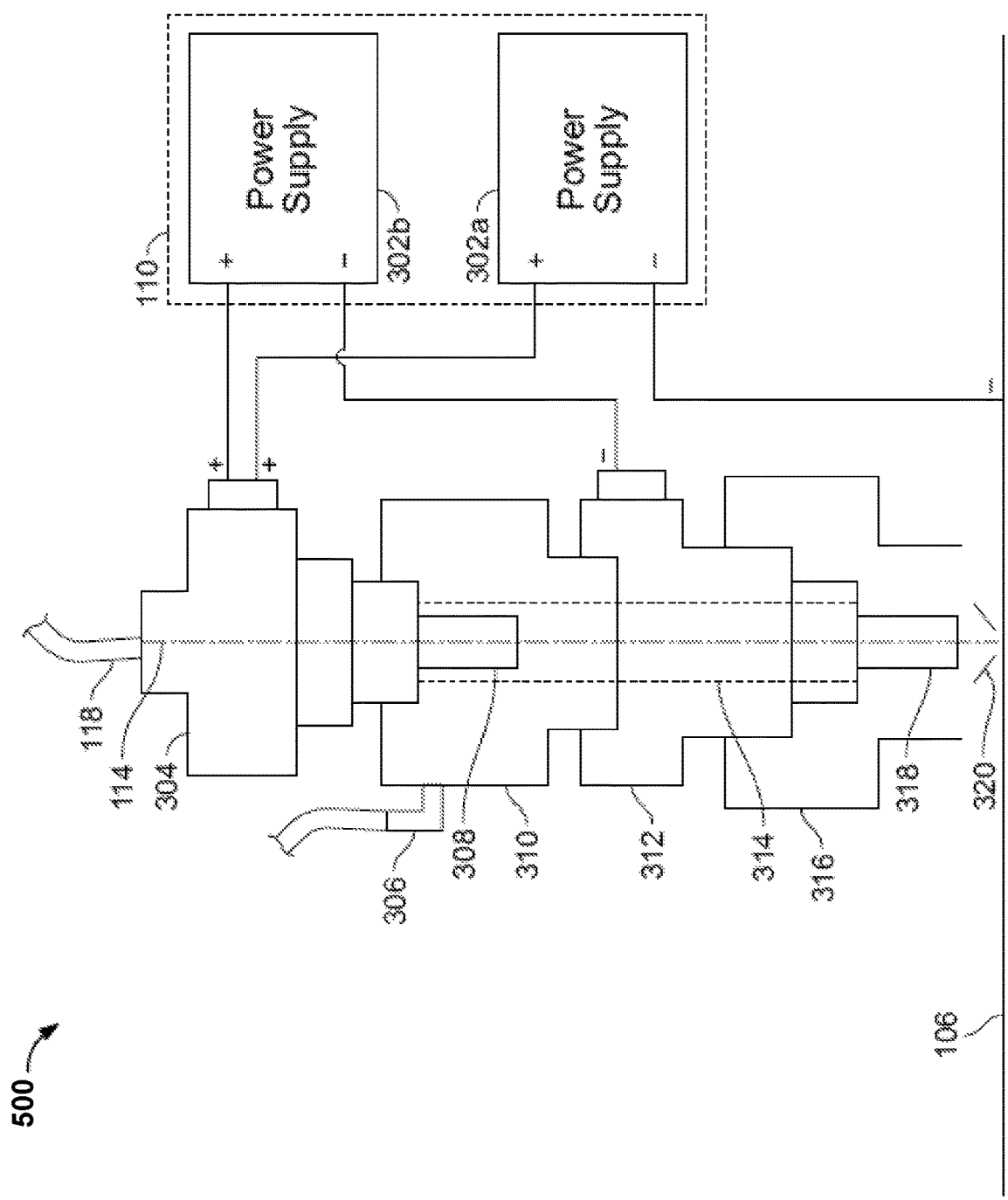
FIG. 5 illustrates a functional diagram of another example contact tip assembly in which the power supply provides the welding power to the electrode wire.

FIG. 5 illustrates a functional diagram of another example contact tip assembly 500. The contact tip assembly 500 is similar to the assembly 206 illustrated in FIG. 3. The assembly 500 includes the power supply 302a to provide the welding power to the electrode wire 114 (e.g., for generating the welding arc 320 or other welding power transfer). The assembly 500 also includes the power supply 302b to generate a preheat current to heat the electrode wire 114.

The assembly includes the first contact tip 318 and the second contact tip 308. The preheating power supply 302b has the same electrical connections to the second contact tip 308 and the first contact tip 318 as described above with reference to FIG. 3. Instead of the welding power supply 302a being electrically connected to the first contact tip 318 (e.g., via the positive polarity connection) and the workpiece 106 (e.g., via the negative polarity connection) illustrated in FIG. 3 above, the welding power supply 302a is electrically connected to the second contact tip 308 via the positive polarity connection and to the workpiece 106 via the negative polarity connection.

In the example assembly of FIG. 5, the preheat power supply 302b provides preheating current to the portion of the electrode wire 114 between the contact tips 308, 318, which may occur before welding and/or during welding. In operation, the welding power supply 302a provides the welding current to support the arc 320. In the configuration of FIG. 5, the energy provided by the welding power supply 302a also preheats the electrode wire 114 between the second contact tip 308 and the arc 320. In some examples, the preheat power supply 302b provides power to preheat the electrode wire 114 in conjunction with the energy provided by the welding power supply 302a, thereby reducing the power to be delivered by the welding power supply 302a.

Figure 6:
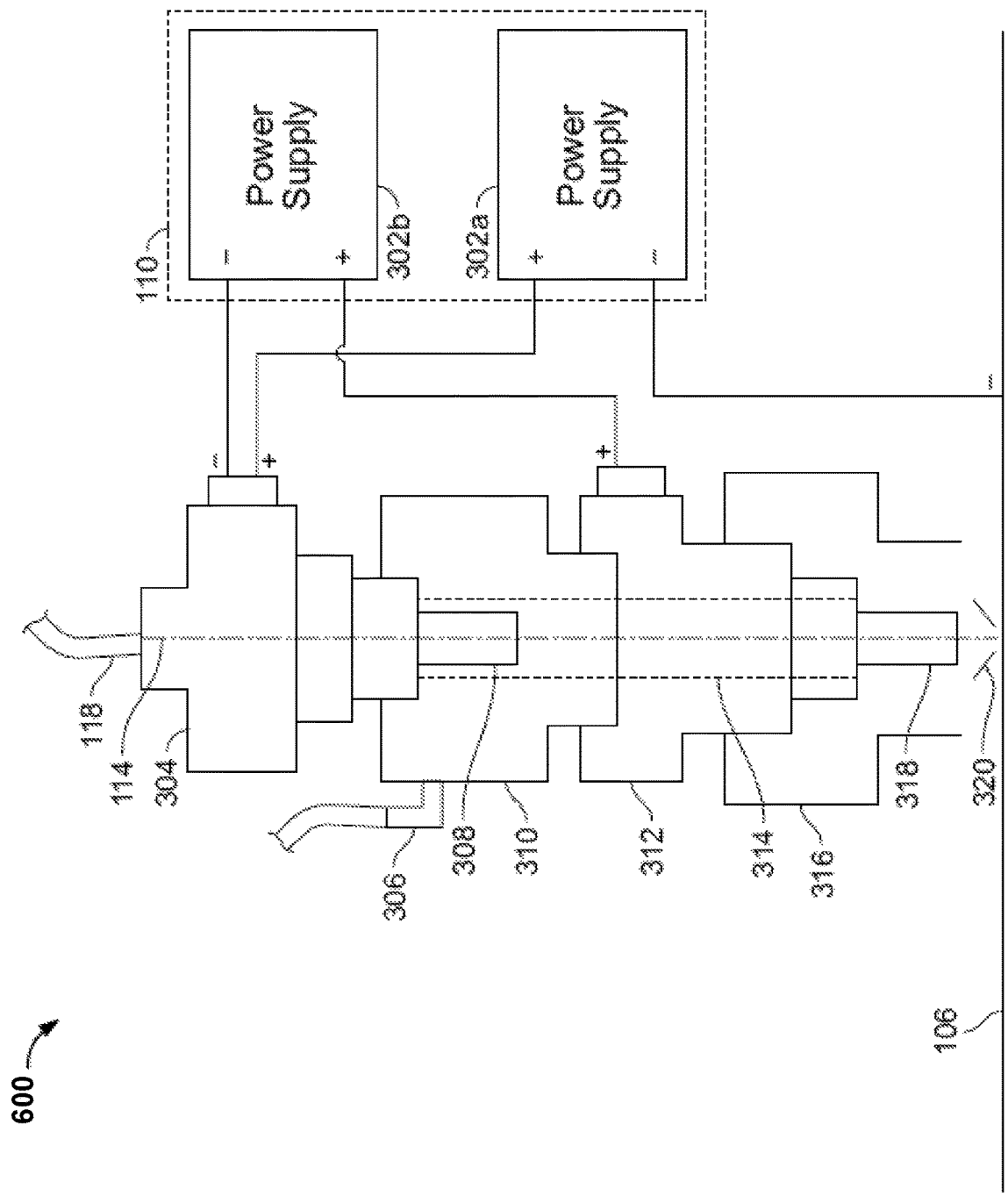
FIG. 6 illustrates a functional diagram of another example contact tip assembly in which the electrical connections between preheat power supply and the contact tips are reversed relative to the connections in FIG. 5.

FIG. 6 illustrates a functional diagram of another example contact tip assembly 600. The assembly 600 is similar to the assembly 500 of FIG. 5. However, the electrical connections between preheat power supply 302b and the contact tips 308, 318 are reversed relative to the connections in FIG. 5. In other words, the preheating power supply 302b is electrically connected to the second contact tip 308 via the negative polarity connection and is electrically connected to the first contact tip 318 via the positive polarity connection.

In the example assembly 600, the power supply 302b may provide preheating power to the portion of the wire between the contact tips 308, 318 while the welding power supply 302a is not providing power (e.g., while not welding). When the welding power supply 302a provides the welding power to the assembly 600, the preheat power supply 302b is switched off and/or used to reduce a portion of the welding power provided by the welding power supply 302a to control preheating of the electrode wire 114 by the welding power supply 302a.

Figure 7:
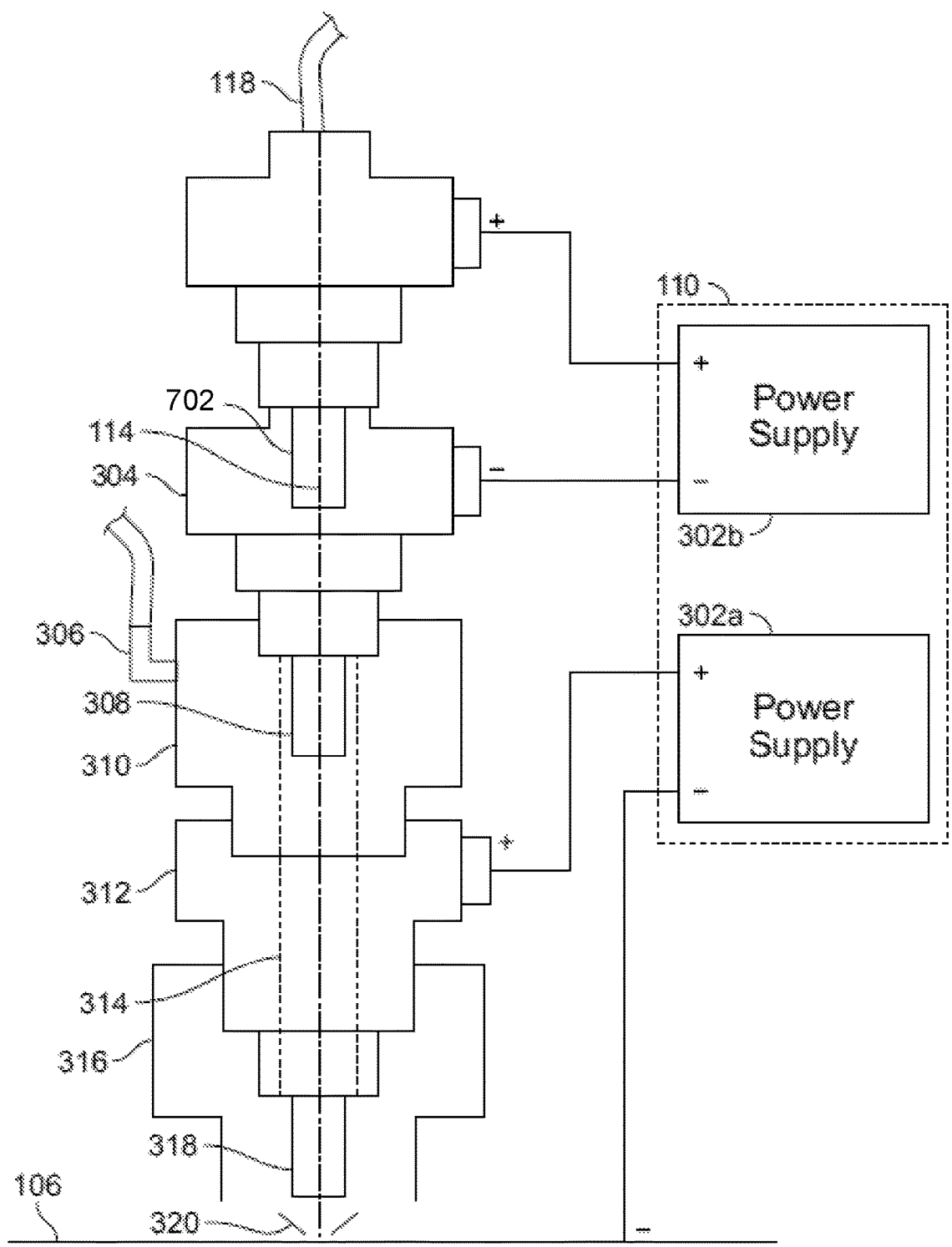
FIG. 7 illustrates a functional diagram of another example contact tip assembly in which the power supply provides the welding power to the electrode wire.

FIG. 7 illustrates a functional diagram of another example contact tip assembly 700. The assembly 700 includes the power supply 302a to provide the welding power to the electrode wire 114 (e.g., for generating the welding arc 320 or other welding power transfer). The assembly 700 also includes the power supply 302b to generate a preheat current to heat the electrode wire 114. The welding power supply 302a is electrically connected to the first contact tip 318 (e.g., via the positive polarity connection) and the workpiece 106 (e.g., via the negative polarity connection).

In the assembly 700 of FIG. 7, the preheating power supply 302b is electrically connected to the electrode wire 114 such that the welding current provided by the power supply 302a is not superimposed on the wire with the preheating current provided by the preheat power supply 302b. To this end, the example assembly 700 includes a third contact tip 702, to which the preheat power supply 302b is electrically connected. While FIG. 7 illustrates an example in which the preheating power supply 302b is electrically connected to the third contact tip 702 via the positive polarity connection and is electrically connected to the second contact tip 308 via the negative polarity connection, in other examples the polarities of the connections are reversed.

Figure 8:
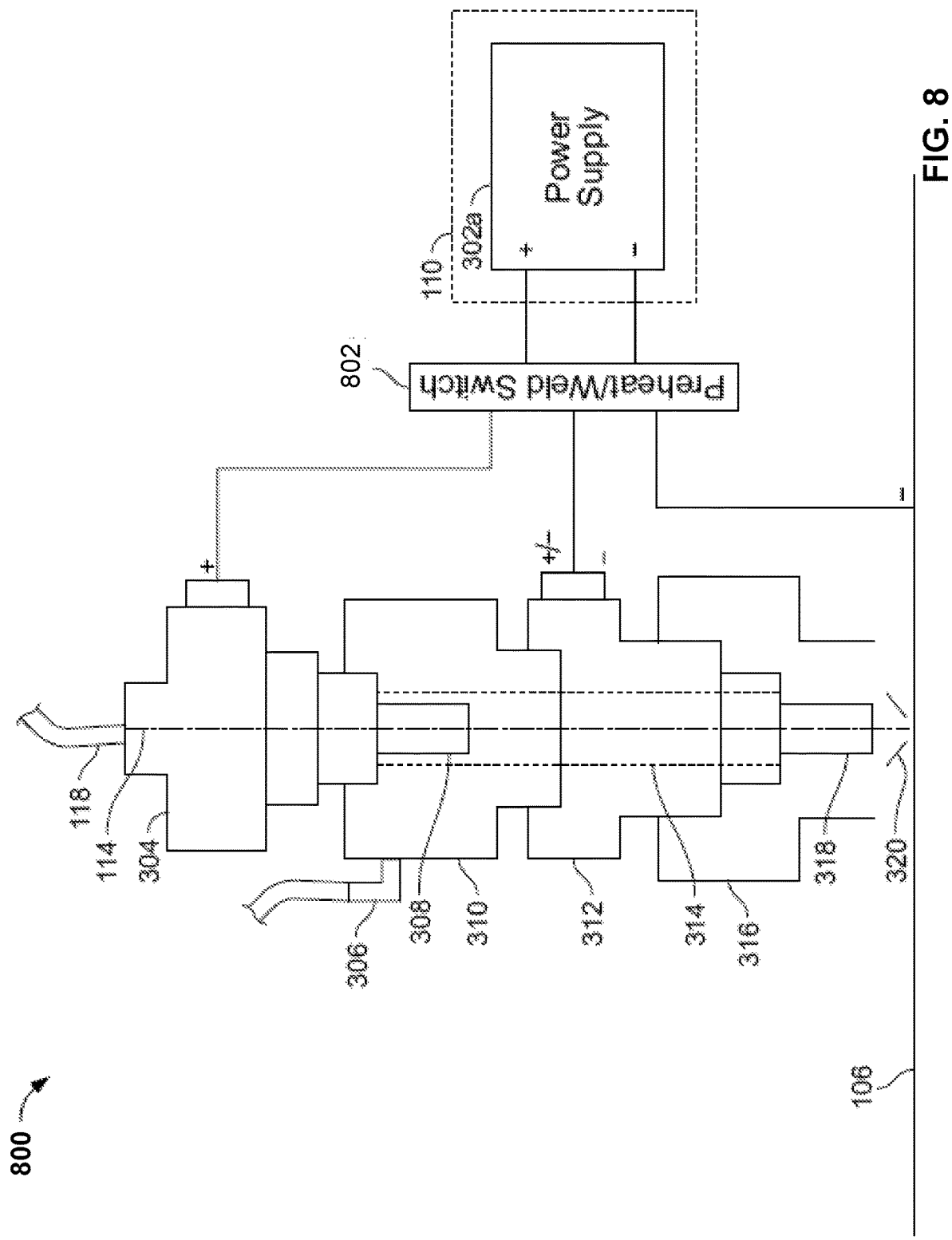
FIG. 8 illustrates a functional diagram of another example contact tip assembly in which a single power supply that provides both preheating power and welding power to the electrode via the first contact tip and/or the second contact tip.

FIG. 8 illustrates a functional diagram of another example contact tip assembly 800. The assembly 800 includes a single power supply that provides both preheating power and welding power to the electrode wire 114 via the first contact tip 318 and/or the second contact tip 308. To control the direction of preheating and/or welding power to the contact tips 308, 318, the assembly 800 includes a preheat/weld switch 802. The preheat/weld switch 802 switches the electrical connections between the welding power supply 302a and the first contact tip 318, the second contact tip 308, and/or the workpiece 106.

The welding power supply 302a provides preheating to the electrode wire 114 by, for example, controlling the preheat/weld switch 802 to connect the positive polarity terminal of the welding power supply 302a to one of the contact tips 308, 318 and to connect the negative polarity terminal of the welding power supply 302a to the other of the contact tips 308, 318. The welding power supply 302a provides welding to the electrode wire 114 by, for example, controlling the preheat/weld switch 802 to connect the positive polarity terminal of the welding power supply 302a to one of the workpiece 106 or one of the contact tips 308, 318 and to connect the negative polarity terminal of the welding power supply 302a to the other of the workpiece 106 or one of the contact tips 308, 318 (e.g., based on whether DCEN or DCEP is being used).

If the preheat/weld switch 802 connects one of the terminals of the welding power supply 302a to the second contact tip 308 and connects the other of the terminals of the welding power supply 302a to the workpiece 106, the welding current supplied by the welding power supply 302a also provides preheating to the electrode wire 114. In some examples, the preheat/weld switch 802 alternates between connecting the welding power supply 302a to a first set of electrical connections for preheating the electrode wire 114 (e.g., connecting to the contact tips 308, 318), to a second set of electrical connections for welding (e.g., connecting to the workpiece 106 and the first contact tip 318), and/or to a third set of electrical connections for simultaneously preheating the electrode wire 114 and welding (e.g., connecting to the workpiece 106 and the second contact tip 308).

Figure 9:
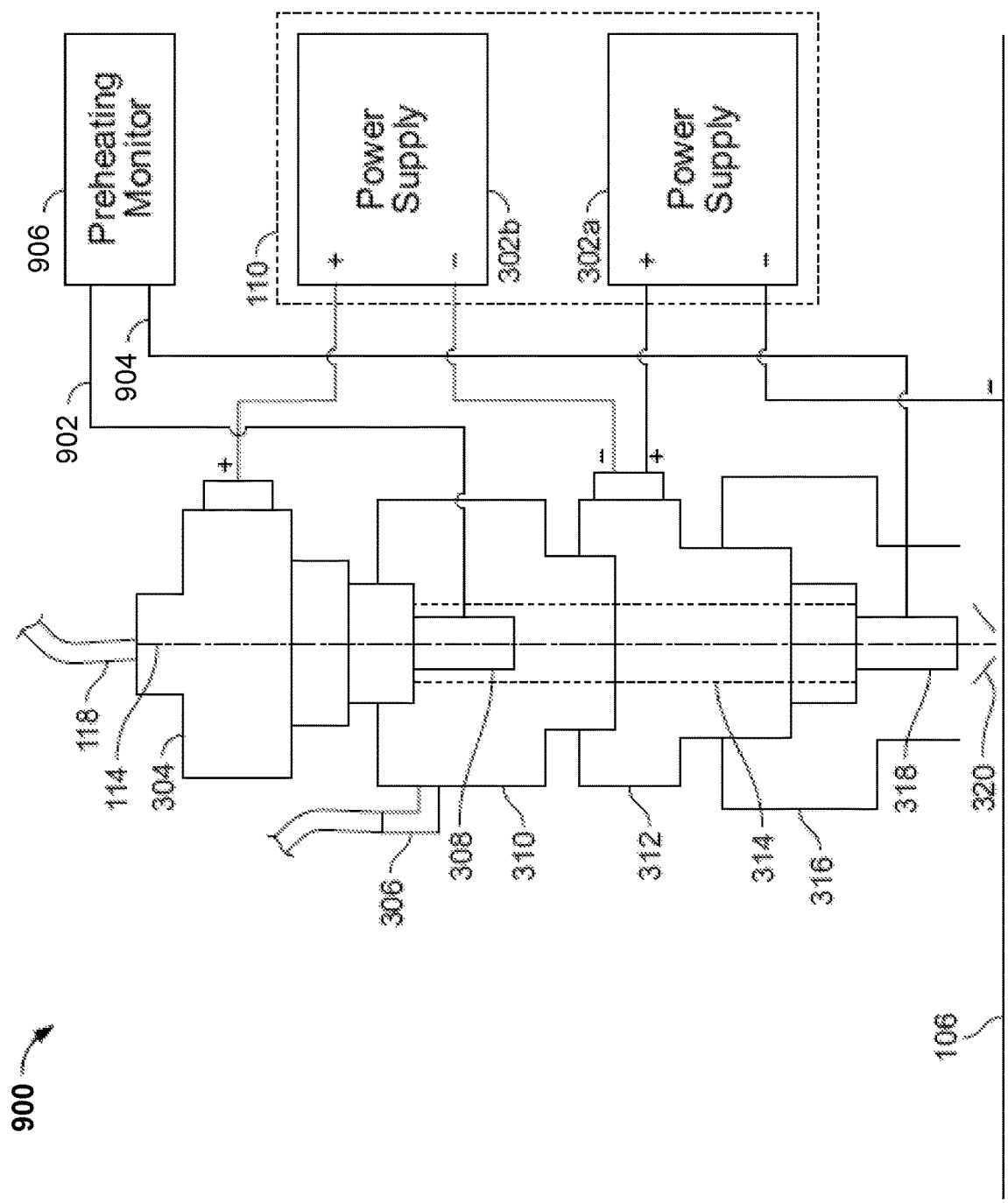
FIG. 9 illustrates an example welding assembly that includes voltage sense leads to measure a voltage drop the two contact tips used for preheating the electrode wire.

FIG. 9 illustrates an example welding assembly 900 that includes voltage sense leads 902, 904 to measure a voltage drop the two contact tips 308, 318 used for preheating the electrode wire 114. A preheating monitor 906 monitors heating anomalies by comparing the measured voltages to target voltage level(s), by evaluating the time derivatives and/or integrals of the measured voltages, and/or by statistical analysis (e.g., means, standard deviations, root-mean-squared (RMS) values, minimum, maximum, etc.). Additionally or alternatively, the preheating monitor 906 monitors the stability of the voltage over a longer-term history (e.g. over seconds, minutes and/or hours). Additionally or alternatively, the preheating monitor 906 monitors preheat current, preheat power, preheat heat content or enthalpy, and/or preheat circuit impedance via the preheat power supply 302b.

Some example welding systems 100 use radiated heating to heat the electrode wire 114 via a wire liner. An example includes constructing the coiled wire liner using a nichrome alloy, platinum, and/or another suitable material, to simultaneously physically support and/or guide the electrode wire 114 from the wire supply to the welding gun and to heat the electrode wire 114 at the same time. The wire liner is heated by the example preheat power supply 302b. A shorter portion of the wire liner may be heated using higher heating current, and/or a longer portion of the wire liner (e.g., most of the wire liner extending from the wire feeder to the welding torch) may be heated using a reduced heating current. The electrode wire 114 is gradually heated by the wire liner using radiated heating so that the electrode wire 114 has an elevated temperature by the time the electrode wire 114 reaches the welding torch and/or the first contact tip 318.

Additionally or alternatively, the welding system 100 may use infrared heating lamps mounted within the gun body to preheat the electrode wire 114. The infrared heating lamps are powered by the preheat power supply 302b.

Disclosed examples may be used to perform cladding operations with reduced dilution of the base material. In such examples, the preheat power supply 302b provides high preheat power to preheat wire to near melting. The welding power supply 302a then provides a relatively low arc current (e.g., 15-200 A) to bring the wire tip to the actual melting point. However, because the relatively low current (e.g., 15-200 A) may not be enough to cause pinching off of the melted wire to transfer the liquid metal across the arc, some such examples use a rapid-response motor to oscillate the wire. Oscillation of the wire jolts or shakes the liquid metal off of the wire tip. An example of such an oscillation technique is described by Y. Wu and R. Kovacevic, "Mechanically assisted droplet transfer process in gas metal arc welding," *Proceedings of the Institution of Mechanical Engineers Vol* 216 *Part B: J Engineering Manufacture*, p. 555, 2002, which is incorporated by reference herein in its entirety. By using low arc current, the example cladding method reduces base metal dilution and/or reduces costs of methods such as laser cladding.

In some other examples, a cladding system uses resistive preheating of the electrode wire and a laser energy source to lay the cladding down. The laser beam may be defocused, and no welding arc (e.g., electrical arc) is present during the cladding operation. In some cases, the welding arc is prevented via a voltage clamping system that clamps the voltage between the wire and the workpiece to less than an arc striking voltage. Such a clamping system may include a diode and/or a transistor.

In some examples, welding-type equipment may be used to perform metal additive manufacturing and/or additive metal coating. For example, a coating system or additive manufacturing system uses the wire preheating and a voltage clamp as described above, but omits the laser. In some other examples, the cladding system uses the wire preheating and omits both the clamp and the laser. In either case, the metal may not necessarily bond to the workpiece, but may form a coating and/or be laid on a base from which the metal can later be removed.

In some examples, a cladding system uses the resistive preheating to preheat the wire. The preheated wire is melted using a TIG welding arc or plasma preheating arc.

Some example cladding systems use the preheating system to perform both pilot preheating (e.g., prior to the wire making contact to the workpiece where the two tips in the torch do the preheating) and a transferred preheating (e.g., open up the tip nearer the workpiece once current starts flowing in the work lead). The cladding system switches the preheating system between the pilot preheating mode and the transferred preheating mode.

In some cases, preheating the electrode with an extended stick out length can suffer from instability, which is caused by the short circuit control response in submerged arc welding and/or in GMAW methods. A conventional short circuit control response is to increase current to clear a detected short circuit. However, the current increase overheats the extended stick out to very high temperatures, causing the wire to loose rigidity and/or mechanical stability. As a result, the superheated wire section melts off at a higher rate than normal and may introduce arc length hunting or oscillation while the welding system 100 attempts to obtain a stable arc length or contact tip to work distance. Some examples address this instability by controlling the welding power supply 302a using a current-controlled (e.g., constant current) mode during a prolonged short circuit event (e.g., a short circuit lasting more than 5 ms). The current-controlled mode does not include a shark fin response or high artificial inductance typical of short circuit clearing methods. For example, the current-controlled mode may use a same average current as used in the spray mode for that wire feed rate (e.g., a high current) or a fixed low current (e.g., 50 A or lower). The welding system 100 may also initiate wire retraction to clear the short circuit. After the short is cleared, the welding system 100 reverts the mode to voltage-controlled (e.g., constant voltage) spray and/or pulse spray mode. In such examples, the wire drive motor is highly responsive (e.g., similar to motors used in controlled short circuit (CSC) modes), but at reduced duty cycles relative to duty cycles used in CSC modes. In such examples, the motor is not used to clear shorts as quickly as in CSC modes.

Some examples increase the deposition rate of welding while reducing heat input to the workpiece using a spray mode. The welding system 100 switches between spray mode at low wire speed mode and cold wire feed at a higher wire speed mode. In this context, cold wire refers to non-melted wire, whether preheated or not preheated. In some such examples, the welding system 100 preheats the electrode wire 114 and performs welding in a spray mode (e.g., voltage-controlled and/or pulse), and then reduces the current to a lower current level (e.g., 50 A or less). After a period of operating in spray mode, the welding system 100 accelerates the wire feed rate (e.g., to the maximum motor feed rate) to input cold (e.g., non-melted) electrode wire 114 to the weld puddle. The input of the cold wire both adds filler metal and cools the weld puddle. Using preheated wire increases deposition of wire into the weld puddle before the weld puddle cools too much to further melt the wire, but preheating of the wire may be omitted. The welding system 100 then retracts the wire while maintaining the lower welding current to clear the short circuit. When the arc is restarted, the welding system 100 returns to the spray mode at the higher current and feeds the electrode wire 114 at the lower wire feed rate. In some examples, the welding system 100 maintains a higher current when feeding the cold wire into the weld puddle to increase deposition, but reduces the current (e.g., to 50 A or less) prior to retracting the wire, to reduce spatter during the arc restart. In such examples, the wire drive motor is highly responsive (e.g., similar to motors used in controlled short circuit (CSC) modes), but at reduced duty cycles relative to duty cycles used in CSC modes. In such examples, the motor is not used to clear shorts as quickly as in CSC modes.

Poor physical contact between the electrode wire 114 and the contact tip 318 can, in some cases, result in arcing between the electrode wire 114 and the contact tip 318, which can damage the contact tip 318. Disclosed examples include a clamping diode (e.g., a Zener diode, a transient voltage suppression diode, a snubber circuit, and/or combination thereof, which may be located inside the torch near the contact tips 308, 318) between to clamp an output voltage of the preheat power source 302b to clamp the output voltage to less than a threshold (e.g., less than 14V). Using the clamping diode reduces or eliminates the likelihood of initiating an arc between the contact tips 308, 318 and the electrode wire 114. Additionally, the clamping diode reduces the likelihood of arcing in the first contact tip 318 for the main welding current. When the physical contact is poor between the electrode wire 114 and the first contact tip 318, the arc current flow may conduct or be redirected through the clamping circuit and the second contact tip 308 to the electrode wire 114 to prevent tip burn back and extend the life of first contact tip 318. The clamping diode is selected to have a current capacity to conduct both preheat current and welding current (e.g., with few hundred nanosecond turn-on). In some examples, the clamping diode is a silicon carbide rectifier diode.

In some examples, the second contact tip 308 is used as a sensor for detecting conditions for arcing at the first contact tip 308 (e.g., without preheating the electrode wire 114). When such conditions for arcing at the first contact tip 318 are detected, the welding system 100 clamps the tip-to-wire contact voltage as described above.

While examples disclosed above include contact tips 308, 318 that are coaxially aligned, in other examples the axes of the contact tips 308, 318 are offset (e.g., parallel but not aligned) and/or tilted (e.g., not parallel). In some other examples, a curved or bent wire support (e.g., ceramic) is provided between the two contact tips 308, 318 to improve contact at the first contact tip 308. In some other examples, the first contact tip 318 is provided with a spring-loaded contact to contact the electrode wire 114, thereby ensuring contact between the first contact tip 318 and the electrode wire 114.

Figure 10:
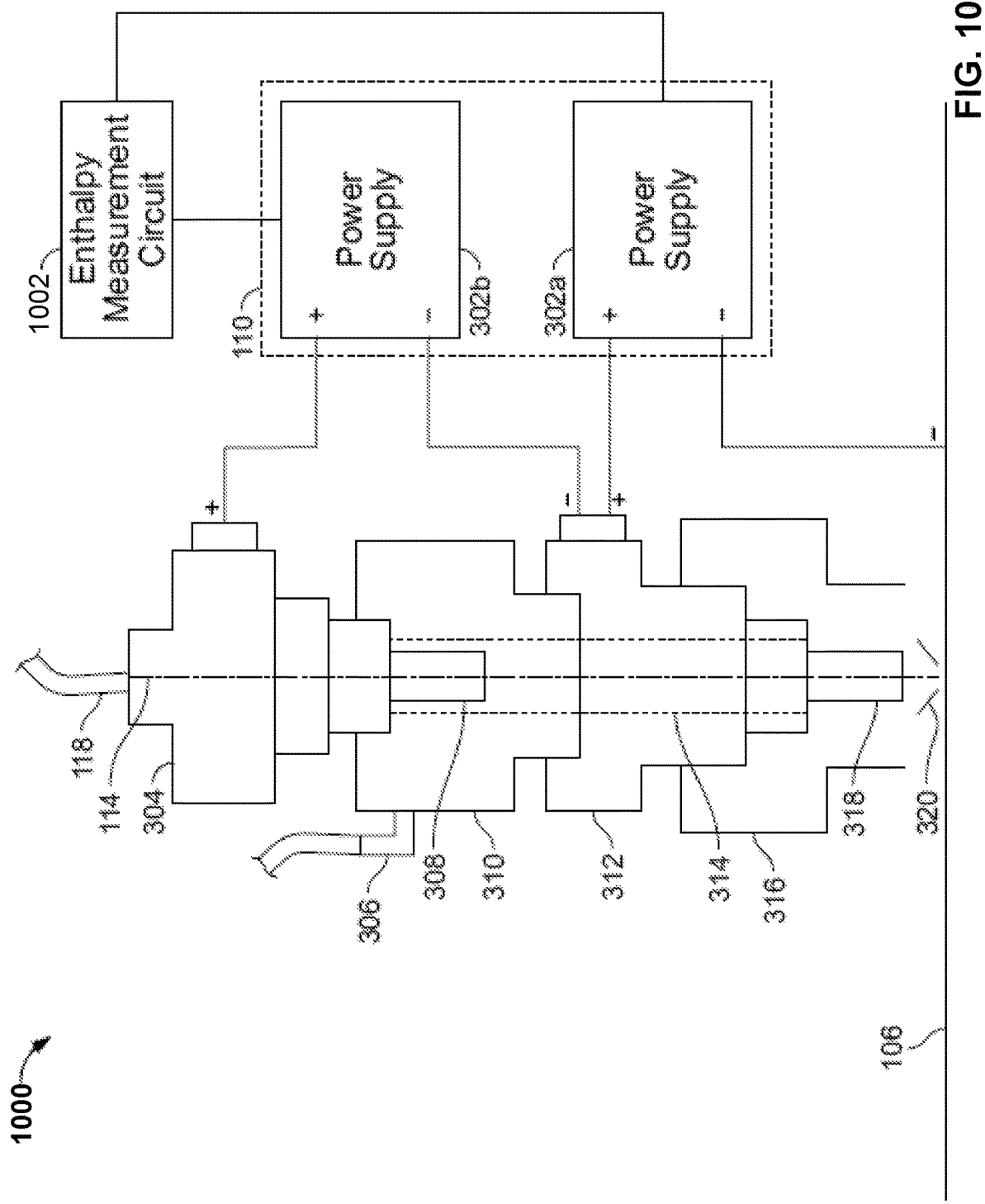
FIG. 10 illustrates an example welding assembly that includes an enthalpy measurement circuit.

FIG. 10 illustrates an example welding assembly 1000 that includes an enthalpy measurement circuit 1002. The enthalpy measurement circuit 1002 determines an enthalpy applied to the workpiece 106. The enthalpy applied to the workpiece 106 by the power supplies 302a, 302b is a sum of the enthalpy introduced to the electrode wire 114 by the preheat power source 302b and the enthalpy introduced by the welding power supply 302a. The example measurement circuit 1002 may determine the enthalpy based on the measured arc voltage, the measured welding-type current, and/or a measured preheating current, or the voltage drop across the portion of the electrode. The electrode preheating circuit 1002 controls the preheating current based on the determined enthalpy and a target enthalpy to be applied to the workpiece 106. For example, the electrode preheating circuit 1002 may reduce the preheating current provided by the preheat power supply 302b based on welding power applied by the welding power supply 302a to maintain a constant enthalpy applied to the workpiece 106. The welding power supply 302a may provide a variable power based on, for example, changes in a contact tip to work distance and/or arc length.

In some examples, the welding system 100 includes a stickout sense circuit that determines an electrode stickout distance of the electrode wire 114. The preheating power supply 302b controls the preheating current based on the electrode stickout distance. An example stickout sense circuit includes a current sensor to measure the welding current supplied by the welding power supply 302a and determines the electrode stickout distance based on the measurement of the welding-type current.

Figure 11:
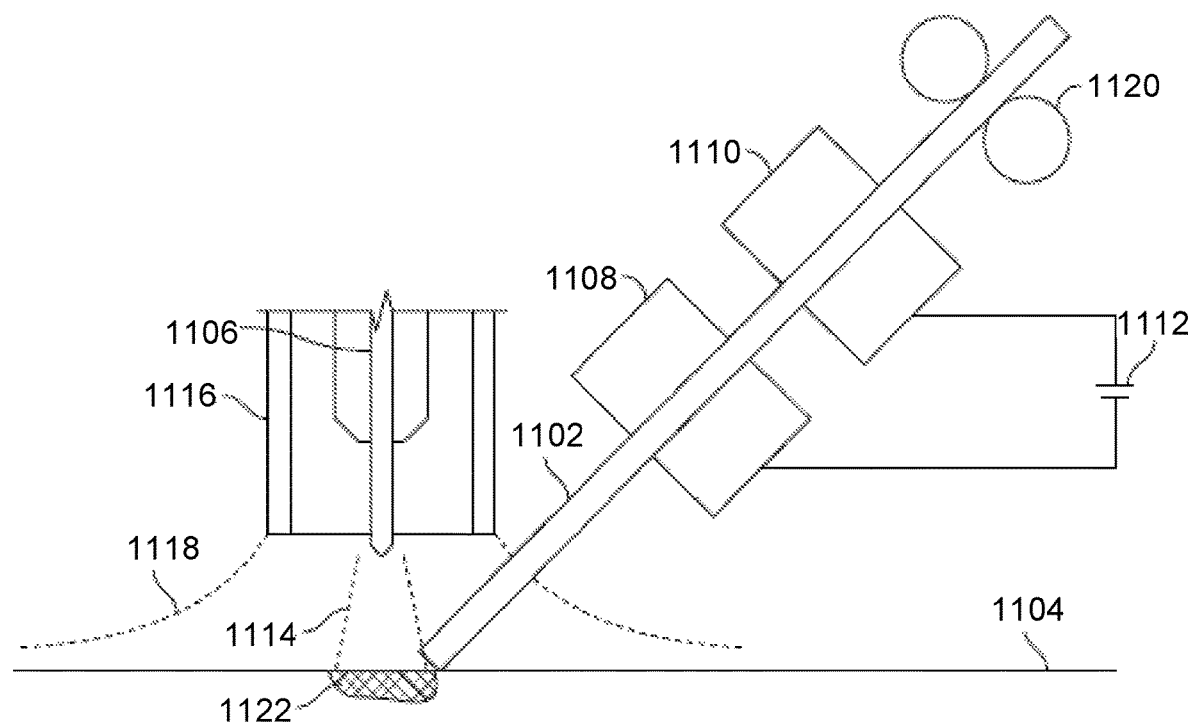
FIG. 11 illustrates an example implementation of providing a resistively preheated wire to a workpiece and providing a separate arcing source, such as a tungsten electrode, to melt the wire.

FIG. 11 illustrates an example implementation of providing a resistively preheated wire 1102 to a workpiece 1104 and providing a separate arcing source, such as a tungsten electrode 1106, to melt the wire 1102 and/or the workpiece 1104. The wire 1102 is preheated using contact tips 1108 and 1110, which are electrically coupled to a preheating power source 1112. The example contact tips 1108, 1110 and the preheating power source 1112, may be implemented as described with reference to any of the examples of FIGS. 3, 5, 6, 7, 9, and/or 10. The preheating power source 1112 may be DC, AC, and/or DC with AC component(s).

The tungsten electrode 1106 generates an electric arc 1114. A gas nozzle 1116 is configured in a same torch as the tungsten electrode 1106 and provides shielding gas 1118. A wire feeder 1120 enables bidirectional travel of the wire 1102 forward and/or in reverse. The wire feeder 1120 may be a reciprocating wire feeder or a non-reciprocating wire feeder. The reciprocating preheated wire 1102 increases the welding or cladding travel speed and, when using certain reciprocating frequencies, produces a grain refinement effect.

For welding, the example preheating power source 1112 preheats the wire 1102 via the contact tips 1108, 1110, and the tungsten electrode 1106 provides the additional heat required to melt the wire 1102 and/or a portion of the workpiece 1104 into a weld puddle 1122. The preheated wire 1102 is melted after being submerged into the weld puddle 1122, is melted by the arc 1114, and/or both. Any of the example control processes described herein may be used to perform welding, brazing, cladding, hardfacing, metal addition, and/or any other welding-type operations.

Figure 12:
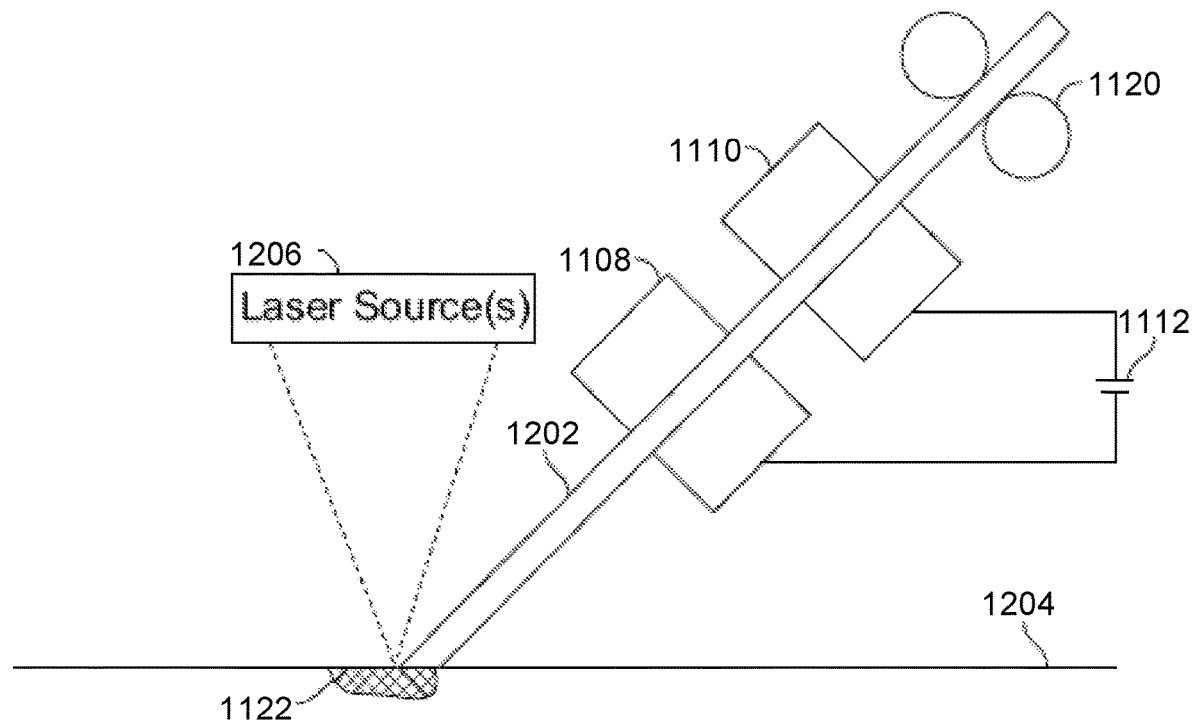
FIG. 12 illustrates an example implementation of providing a resistively preheated wire to a workpiece and providing a separate arcing source, such as one or more laser source(s), to melt the wire.

FIG. 12 illustrates an example implementation of providing a resistively preheated wire 1202 to a workpiece 1204 and providing a separate arcing source, such as one or more laser head(s) 1206, to melt the wire 1202. The example of FIG. 12 includes the contact tips 1108 and 1110, the preheating power source 1112, and the wire feeder 1120 of FIG. 11. The example contact tips 1108, 1110 and the preheating power source 1112, may be implemented as described with reference to any of the examples of FIGS. 3, 5, 6, 7, 9, and/or 10.

Similar to the tungsten electrode 1106 of FIG. 11, the laser head(s) 1206 of FIG. 12 provide sufficient power to melt the workpiece 1204 to produce the weld puddle 1122, into which the preheated wire 1202 is submerged to melt the preheated wire 1202 for metal deposition. Use of the preheated wire 1202 involves applying less energy to the workpiece 1204 via the laser head(s) 1206 than would be required when using a cold wire. In some cases, the preheated wire 1102 gets melted after submerged into the workpiece 1104 and/or the weld puddle 1122 without extra heat from the laser. In other cases, the laser adds more heat to the wire to be melted into the melt pool 1122. The reduced laser power and heat help reduce base metal dilution of the workpiece 1104 in a corrosion resistant weld overlay. As a result, the examples of FIGS. 11 and/or 12 can achieve increased deposition rates over conventional cold wire welding processes, with less likelihood of burning through the workpieces 1104, 1204.

In some examples, the welding system 100 reacts to wire short circuiting events. The example welding system 100 uses feedback to shut down preheat power immediately to prevent soft, preheated wire from being compressed and causing a jam between the first contact tip 318 and the second contact tip 308. The welding system 100 uses feedback such as from a wire feed motor (e.g., motor current, motor torque, etc.) and/or another wire feed force sensor between the two tips motor current or other feeding force sensor to provide rapid detection. Additionally or alternatively, the welding system 100 uses feedback such as a duration of the short circuit measurement (e.g., arc voltage) to detect a wire stubbing event (e.g., extinguishing of the arc by contacting the electrode wire 114 to the workpiece 106). In response to detecting the event, the welding system 100 shuts down or disables the preheat power supply to prevent wire noodling between the contact tips. Alternatively, the amount of wire preheating can be reduced in response to detecting the event. In some examples, the preheat amount can be further reduced (e.g., by stepping and/or ramping), depending on the duration of the event.

In some examples, the welding system 100 includes a welding-type power source to provide welding-type power to a welding-type circuit, where the welding-type circuit includes a welding-type electrode and a first contact tip of a welding torch as discussed herein. The example welding system 100 also includes one of the example preheating circuits disclosed herein, which provides preheating power through a first portion of the welding-type electrode via a second contact tip of the welding torch. Disclosed examples further include the electrode preheating control circuit 322 that is configured to control the preheating power based on a user input specifying the preheating power.

Figure 13:
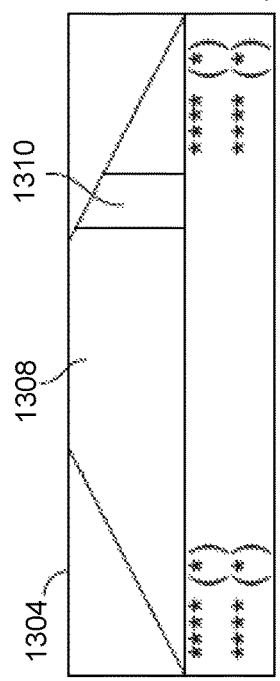
FIG. 13 illustrates an example user interface device that may be used to implement the user interface of the welding equipment.

In some examples, the welding equipment 110 includes or is in communication with a user interface device to enable a user to adjust one or more preheat effects and/or parameters. For example, the user interface device may receive a selection of the preheating power, and the electrode preheating control circuit 322 controls the preheating power and the welding-type power based on the selection. FIG. 13 illustrates an example user interface device 1300 that may be used to implement the user interface of the welding equipment. The example user interface 1300 may be implemented alone or as part of a larger welding user interface that permits control of other aspects of the welding equipment 110, such as voltage, current, and/or wire feed speed setpoints, among other things.

The welding equipment 110 may use default voltage command(s), default current command(s), default power command(s), and/or default enthalpy command(s) to the preheating power source (e.g., the power supplies 302*a*, 302*b*) for corresponding wire speeds, joint thicknesses, and/or joint geometry. However, such default commands may not always be the user-desired amount for all situations. For example, the operator may desire to change the command slightly to control the amount of penetration and/or heat input which, in turn, may mitigate weld distortion. The example user interface 1300 enables the user to fine tune the preheat section of the weld condition to satisfy a particular application. The user interface 1300 enables the user to select one or more of a preheating current, a preheating voltage, the preheating power, or a preheating enthalpy.

The example user interface 1300 includes a preheat adjustment device 1302 and one or more preheat indicator devices 1304, 1306. In the example of FIG. 13, the preheat adjustment device 1302 is a dial that permits the user to increase and/or decrease the preheat level implemented by the welding equipment 110 (e.g., by any of the example assemblies 206, 500, 600, 700, 800, 900, 1000 of FIG. 3, 5, 6, 7, 8, 9, or 10).

The user interface 1300 displays values representing the preheating power and/or the welding-type power, and updates the values in response to the selection of the preheating power level. In the example of FIG. 13, the digital preheat indicator 1306 indicates a numerical representation of the effect(s) on the weld of changing the preheat level 1308 via the preheat adjustment device 1302.

Figure 14A:
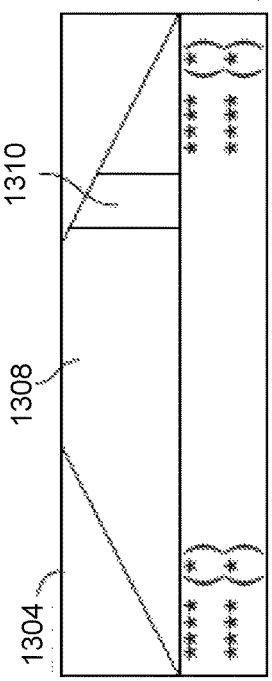
FIGS. 14A, 14B, and 14C illustrate example average heat inputs for different preheat levels.
Figure 14B:
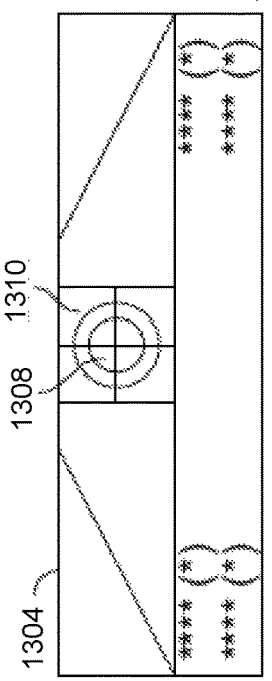
Figure 14C:
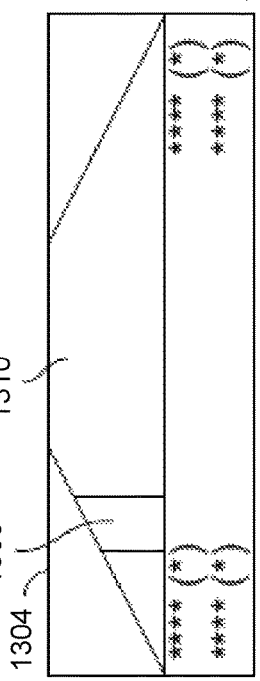

For example, the digital preheat indicator 1306 displays an average heat input to the weld based on the preheat level 1308. FIGS. 14A, 14B, and 14C illustrate example average heat inputs for different preheat levels. The system 100 may adjust the welding type power in response to user changes to the preheating power, and/or vice versa. Other example numerical representations include the voltage command, the preheat current, the total energy of the system, and/or efficiency.

The user interface 1300 also displays the values with reference to permitted selection ranges of the values. For example, the graphic preheat indicator 1304 device graphically indicates to a user the preheat level 1308 selected via the preheat adjustment device 1302, relative to a default preheat level 1310 and relative to a permitted range of the preheat level. The graphic preheat indicator 1304 also includes identifiers indicating the effects of adjusting the preheating level on weld penetration and/or other effects. For example, the graphic preheat indicator 1304 indicates that, as the preheat level is increased, the weld penetration decreases and, conversely, the weld penetration increases as the preheat level is decreased. As illustrated in FIGS. 14A, 14B, and 14C, the preheat level 1308 is graphically represented as shifting left and right as the graphic preheat indicator 1304 is adjusted.

The user interface 1300 of FIGS. 13, 14A-14C may limit the selection of the preheating power using an upper preheating limit and/or a lower preheating limit. For example, the user interface 1300 may limit the range of the adjustment knob 1302 and/or limit increases or decreases in the preheating power in response to the adjustment knob 1302 when the upper or lower preheating limit has been reached.

In some examples, the user interface 1300 may receive the user input as a specification of a ratio of the preheating power and the welding-type power. The indicator device(s) 1304, 1306 (e.g., display devices) may display a balance between the preheating power and the welding-type power based on the user input, display a total heat input of the preheating power and the welding-type power, and/or update the displays of the balance and the total heat input in response to a change in the user input. Additionally or alternatively, the user interface 1300 may receive a selection of an amount of weld penetration and/or a wire deposition rate. As with the selection of the preheating power, the user interface 1300 may limit the selection of the amount of weld penetration to an upper penetration limit and/or a lower penetration limit and/or limit the selection of the wire deposition rate to an upper wire deposition rate limit and/or a lower wire deposition rate limit. In some such examples, the user interface 1300 displays an effect of changing the weld penetration on the preheating power, the welding power, the heat input, the welding voltage, the preheating voltage, the preheating wattage, the welding wattage, the welding current, and/or the preheating current, and the electrode preheating control circuit 322 controls the preheating power and the welding-type power based on the selection of the amount of weld penetration. For example, the electrode preheating control circuit 322 may decrease the preheating power and increase the welding-type power in response to an increase in the selected weld penetration and/or increase the preheating power and decrease the welding-type power in response to a decrease in the selected weld penetration. When the user selects a wire deposition rate, the electrode preheating control circuit 322 may increase the preheating power and increase a wire feed speed of the electrode in response to an increase in the selected wire deposition rate and/or decrease the preheating power and decrease a wire feed speed of the electrode in response to an decrease in the selected wire deposition rate.

The user interface 1300 may enable selection of any one and/or combination of preheating current, preheating voltage, preheating wattage, impedance, electrode preheated temperature, a power balance between the preheating wattage and arc wattage, a total heat input to the weld, a preheating enthalpy, and/or any other aspect of preheating power controllable via the electrode preheating control circuit 322. The user interface 1300 may additionally or alternatively enable selection of a voltage balance, a wattage balance, a current balance, a heat balance, and/or an enthalpy balance, between the electrode preheating circuit and the welding-type circuit. Furthermore, any of the selections that may be implemented via the user interface 1300 may be automatically selected by the electrode preheating control circuit 322, such as at the request of the user based on one or more aspects of the weld to be performed. For example, a user may select, using the user interface 1300, one or more of a penetration value, a workpiece thickness, or a wire diameter of the welding-type electrode wire 114, and the electrode preheating control circuit 322 controls the preheating power and/or the welding-type power based on the aspects of the weld input by the user.

In addition or as an alternative to the user interface 1300, the system 100 may implement operator control of preheat power, such as the voltage, current, wattage, enthalpy, impedance, heat input, and/or penetration, using finger-tip control (e.g., on the torch 108), foot control (e.g., similar to a foot pedal used in GTAW), and/or any other control device that enables a user to control the preheat power while welding.

Figure 15:
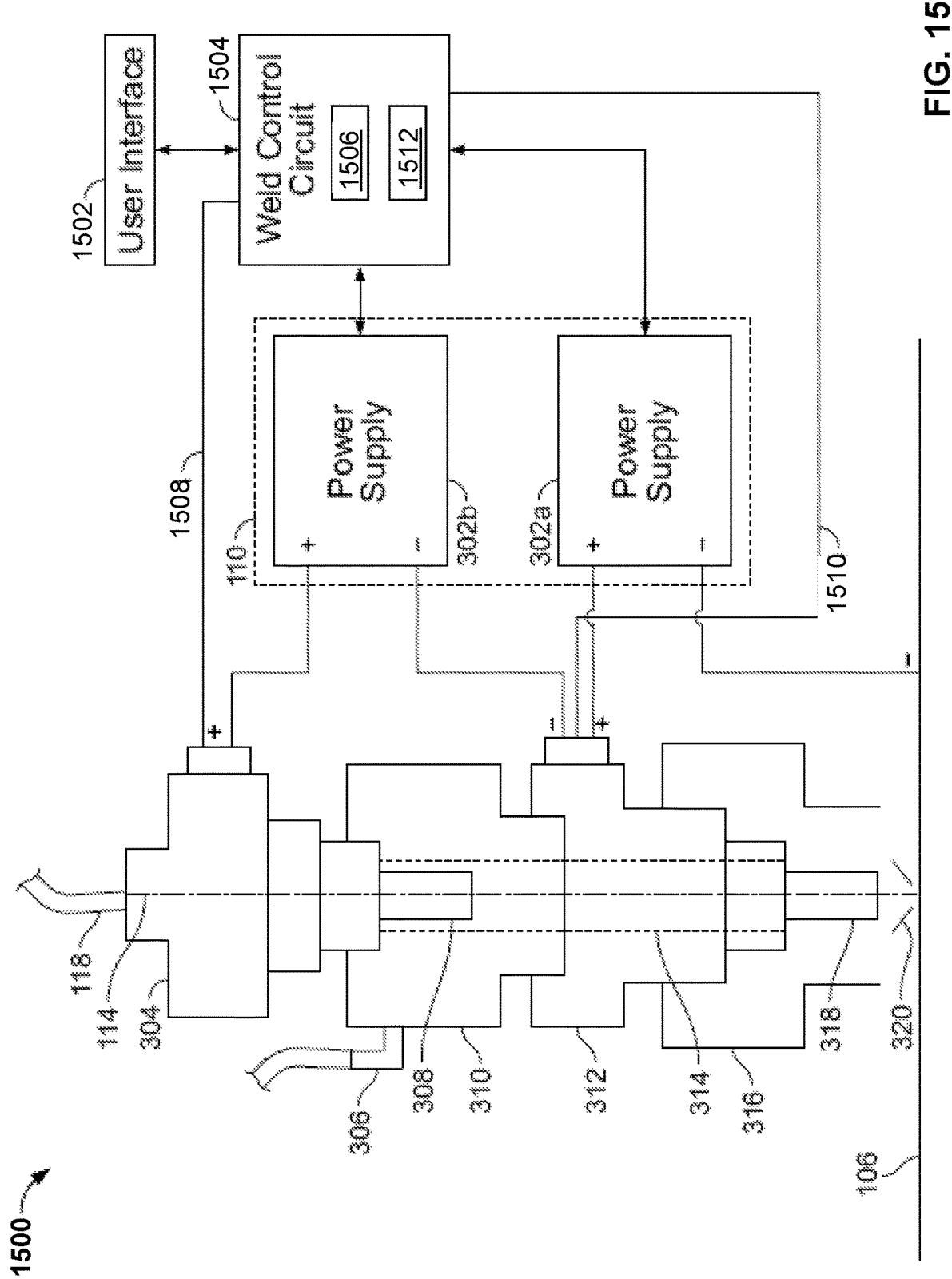
FIG. 15 illustrates an example welding assembly that uses includes a user interface and a weld control circuit that implements a preheat control loop.
Figure 16A:
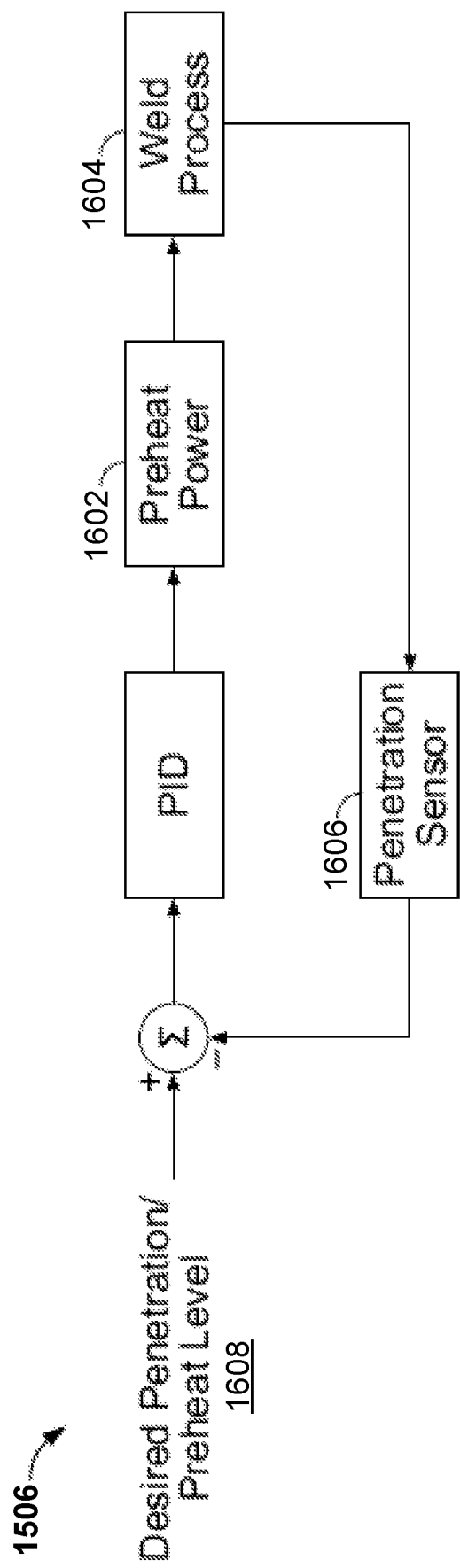
FIG. 16a is a block diagram of an example implementation of the preheat control loop of FIG. 15.

FIG. 15 illustrates an example welding assembly 1500 that uses includes a user interface 1502 and a weld control circuit 1504 that implements a preheat control loop 1506. FIG. 16*a* is a block diagram of an example implementation of the preheat control loop 1506. The user interface 1502 includes the user interface 1300 of FIG. 13 or another interface to enable a user of the welding assembly 1500 to adjust a preheat level. The weld control circuit 1504 receives a preheat level (or penetration level) selected via the user interface 1502 and controls the power supply 302*b* to change the preheat level. The weld control circuit 1504 may further control the power supply 302*a* to adjust one or more aspects of the welding power based on the preheat level selected to improve performance at the selected preheat level. The weld control circuit 1504 is configured to control the preheating power based on at least one of a target total heat input for a weld, a travel speed, a target bead width, or a target penetration depth The example weld control circuit 1504 may implement the electrode preheat control circuit 322.

The example preheat control loop 1506 of FIG. 16*a* automatically controls preheat power 1602 to a weld process 1604 to maintain constant penetration by using feedback from a penetration sensor 1606. An example penetration sensor uses weld current as a measure of weld penetration. Pulse voltage signature disruption by metal vapor pressure can be an advance indication of burn-through. The example preheat control loop 1506 uses the penetration sensor 1606 as close-loop feedback (e.g., subtractive feedback from a desired penetration and/or preheat level 1608 input from the user interface 1502). The preheat control loop 1506 may improve poor penetration (e.g. partial penetration) and/or prevent burn-through by detecting penetration and then using preheat power to adjust the penetration independently without introducing process instability. Other example penetration sensors that may be used include infrared sensors external to the welding arc and the weld pool.

Figure 16B:
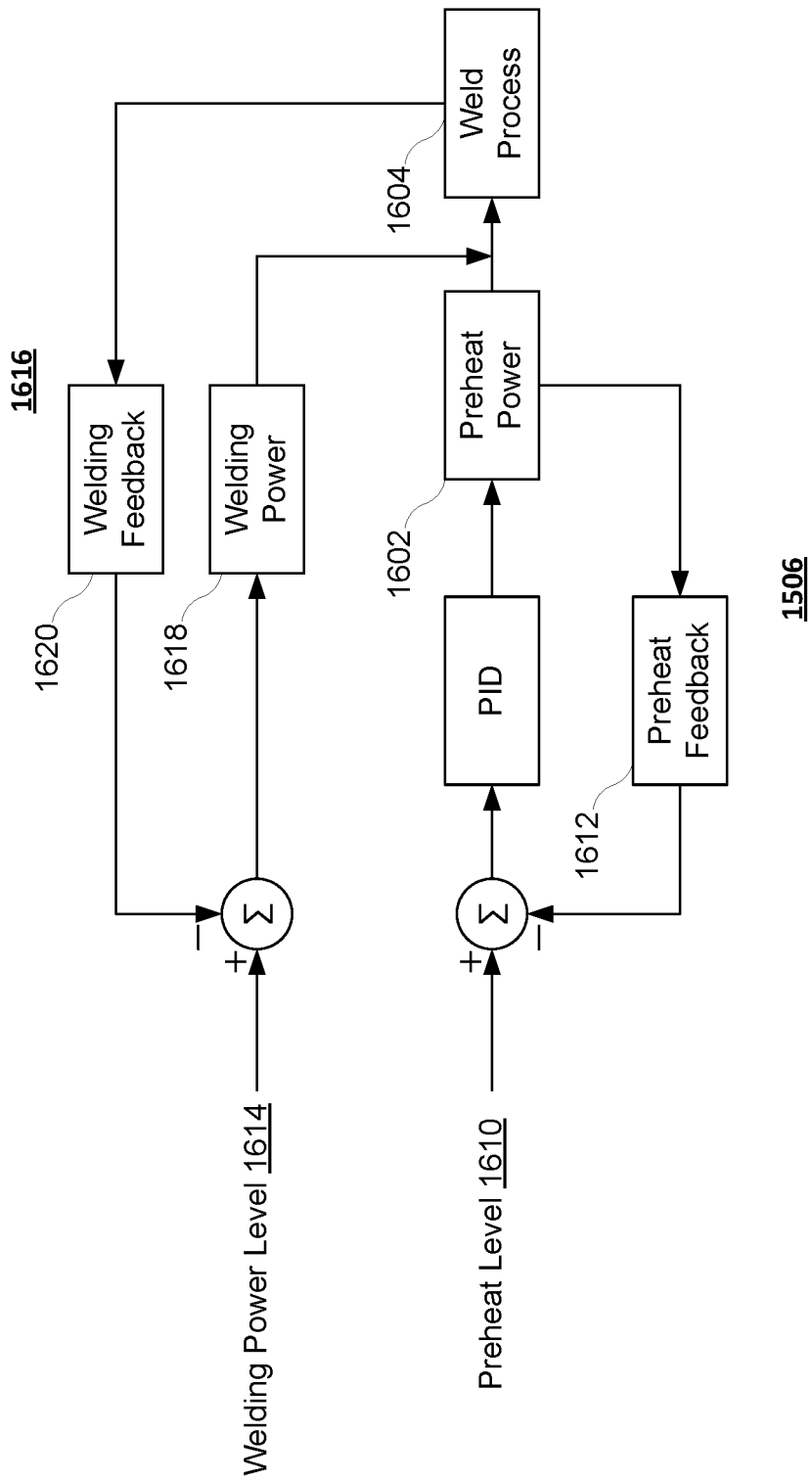
FIG. 16b is a block diagram of another example implementation of the preheat control loop of FIG. 15.

FIG. 16*b* illustrates another example implementation of the preheat control loop 1506 of FIG. 15. The preheat control loop 1506 of FIG. 16*b* automatically controls the preheat power 1602 to the weld process 1604 based on a user input 1610 that specifies the preheating power. For example, as illustrated in FIG. 13, the user input 1610 may increase or decrease the preheating power via the preheat adjustment device 1302. The user input 1610 may control the preheating current, the preheating voltage, the preheating power, and/or the preheating enthalpy. As mentioned above, the user input 1610 may be limited by upper and/or lower limit values.

The preheat control loop 1506 of FIG. 16*b* accesses preheating feedback 1612. The preheating feedback may be a measured preheating voltage, a measured preheating current, a measured preheating power, a measured preheating enthalpy, a measured electrode wire temperature and/or any other feedback.

FIG. 16*b* also illustrates a welding power level 1614 as an input to a welding control loop 1616. The welding power level 1614 may be, for example, a target weld current for a current-controlled weld process and/or a target weld voltage for a voltage-controlled weld process. The welding control loop 1616 outputs welding power 1618, which is combined with the preheating power 1602 for the weld process 1604. The welding control loop 1616 also receives welding feedback 1620, such as a measured arc voltage or measured arc current.

As a user changes the preheat level 1610, the corresponding change in the preheat power 1602 affects the welding process 1604, the welding feedback 1620, and the welding power 1618. For example, if a user increases the desired preheat level 1610 while the welding power level 1614 remains at a constant voltage level, the control loop 1616 reduces the welding power 1618 by reducing the welding current so that a total power input and/or a total heat input remains the same. However, weld penetration may decrease due to the increased ratio of preheat power to welding power.

As shown in FIG. 16b, the electrode preheating control circuit 322 and/or the weld control circuit 1504 is configured to control the welding-type power based on the preheating power.

Returning to FIG. 15, the example assembly 1500 further includes voltage sense leads 1508, 1510 to measure a voltage across the preheated portion of the electrode wire 114. The voltage sense leads 1508, 1510 may be coupled, for example, to the two contact tips 308, 318, a wire liner, a wire drive motor, a diffuser in the weld torch, and/or any other substantially electrically equivalent points). The weld control circuit 1504 controls the preheat power supply 302b using a preheat control loop 1512. The preheat control loop 1512 uses the voltage sensed via the leads 1508, 1510 and the current output by the power supply 302b to maintain a commanded power input, current input, voltage input, enthalpy, and/or impedance to the section of the electrode wire 114. In the example of FIG. 15, the preheat control loop 1512 uses an error between a commanded preheat voltage and the voltage sensed via the sense leads 1508, 1510 to adjust the preheat current, the preheat voltage, and/or the preheat power.

In some examples, the weld control circuit 1504 controls the preheat level 1610 and the welding power level 1614, and modifies the welding power level 1614 in response to changes in the preheat level 1610 by the user. Additionally or alternatively, the preheat level 1610 and/or the welding power level 1614 may be specified by the user in terms of a target heat input, a target preheating power level, a target ratio between the preheating power and the welding-type power, and/or a target arc penetration.

Figure 17:
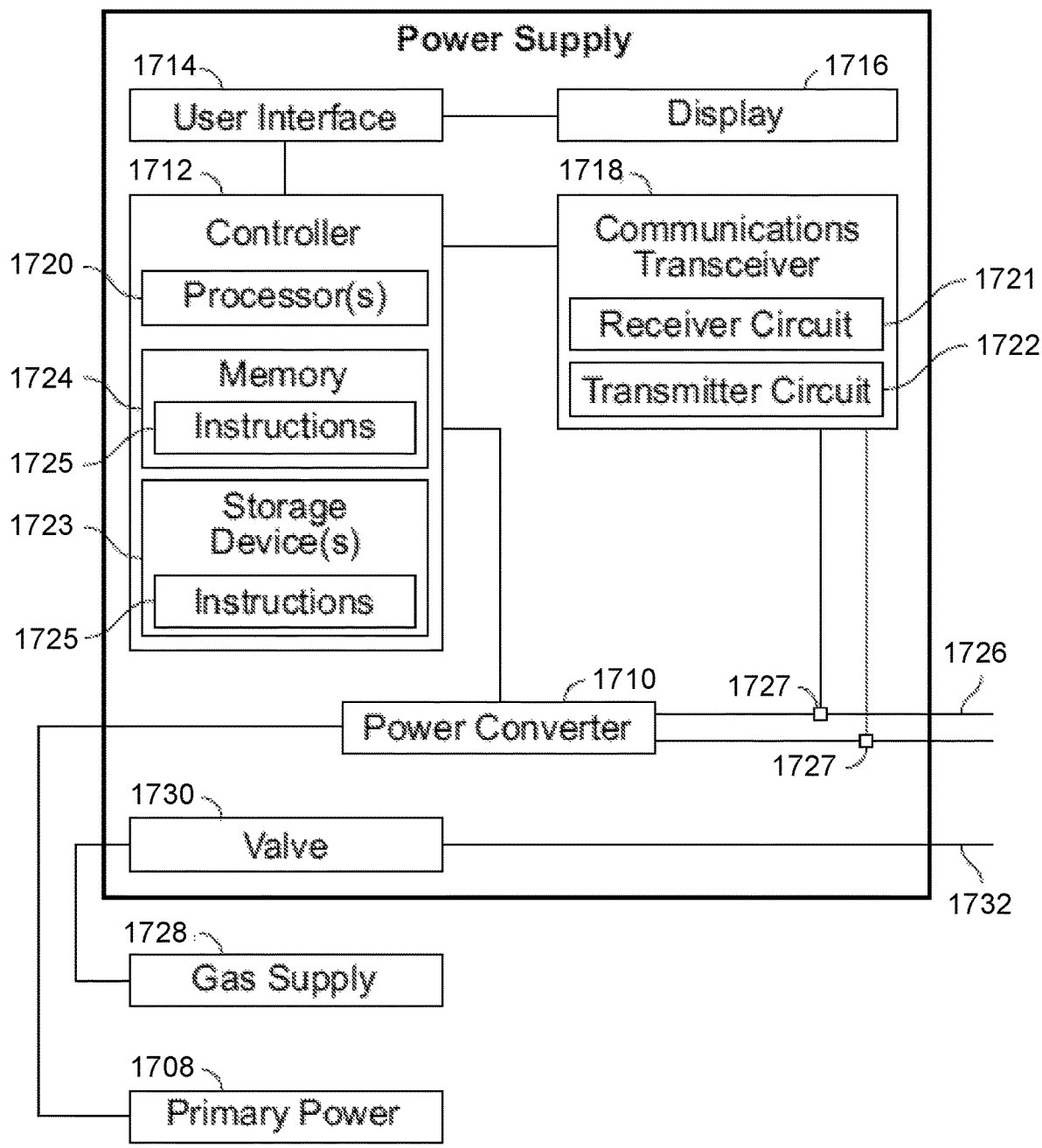
FIG. 17 is a block diagram of an example implementation of the power supplies of FIGS. 3, 5, 6, 7, 8, 9, 10, and/or 15.

FIG. 17 is a block diagram of an example implementation of the power supplies 302a, 302b of FIGS. 3, 5, 6, 7, 8, 9, 10, and/or 15. The example power supply 302a, 302b powers, controls, and supplies consumables to a welding application. In some examples, the power supply 302a, 302b directly supplies input power to the welding torch 108. In the illustrated example, the welding power supply 302a, 302b is configured to supply power to welding operations and/or preheating operations. The example welding power supply 302a, 302b also provides power to a wire feeder to supply the electrode wire 114 to the welding torch 108 for various welding applications (e.g., GMAW welding, flux core arc welding (FCAW)).

The power supply 302a, 302b receives primary power 1708 (e.g., from the AC or DC power grid, an engine/generator set, a battery, or other energy generating or storage devices, or a combination thereof), conditions the primary power, and provides an output power to one or more welding devices and/or preheating devices in accordance with demands of the system. The primary power 1708 may be supplied from an offsite location (e.g., the primary power may originate from the power grid). The welding power supply 302a, 302b includes a power converter 1710, which may include transformers, rectifiers, switches, and so forth, capable of converting the AC input power to AC and/or DC output power as dictated by the demands of the system (e.g., particular welding processes and regimes). The power converter 1710 converts input power (e.g., the primary power 1708) to welding-type power based on a weld voltage setpoint and outputs the welding-type power via a weld circuit.

In some examples, the power converter 1710 is configured to convert the primary power 1708 to both welding-type power and auxiliary power outputs. However, in other examples, the power converter 1710 is adapted to convert primary power only to a weld power output, and a separate auxiliary converter is provided to convert primary power to auxiliary power. In some other examples, the power supply 302a, 302b receives a converted auxiliary power output directly from a wall outlet. Any suitable power conversion system or mechanism may be employed by the power supply 302a, 302b to generate and supply both weld and auxiliary power.

The power supply 302a, 302b includes a controller 1712 to control the operation of the power supply 302a, 302b. The welding power supply 302a, 302b also includes a user interface 1714. The controller 1712 receives input from the user interface 1714, through which a user may choose a process and/or input desired parameters (e.g., voltages, currents, particular pulsed or non-pulsed welding regimes, and so forth). The user interface 1714 may receive inputs using any input device, such as via a keypad, keyboard, buttons, touch screen, voice activation system, wireless device, etc. Furthermore, the controller 1712 controls operating parameters based on input by the user as well as based on other current operating parameters. Specifically, the user interface 1714 may include a display 1716 for presenting, showing, or indicating, information to an operator. The controller 1712 may also include interface circuitry for communicating data to other devices in the system, such as the wire feeder. For example, in some situations, the power supply 302a, 302b wirelessly communicates with other welding devices within the welding system. Further, in some situations, the power supply 302a, 302b communicates with other welding devices using a wired connection, such as by using a network interface controller (NIC) to communicate data via a network (e.g., ETHERNET, 10 baseT, 10 base100, etc.). In the example of FIG. 1, the controller 1712 communicates with the wire feeder via the weld circuit via a communications transceiver 1718.

The controller 1712 includes at least one controller or processor 1720 that controls the operations of the welding power supply 1702. The controller 1712 receives and processes multiple inputs associated with the performance and demands of the system. The processor 1720 may include one or more microprocessors, such as one or more "general-purpose" microprocessors, one or more special-purpose microprocessors and/or ASICS, and/or any other type of processing device. For example, the processor 1720 may include one or more digital signal processors (DSPs).

The example controller 1712 includes one or more storage device(s) 1723 and one or more memory device(s) 1724. The storage device(s) 1723 (e.g., nonvolatile storage) may include ROM, flash memory, a hard drive, and/or any other suitable optical, magnetic, and/or solid-state storage medium, and/or a combination thereof. The storage device 1723 stores data (e.g., data corresponding to a welding application), instructions (e.g., software or firmware to perform welding processes), and/or any other appropriate data. Examples of stored data for a welding application include an attitude (e.g., orientation) of a welding torch, a distance between the contact tip and a workpiece, a voltage, a current, welding device settings, and so forth.

The memory device 1724 may include a volatile memory, such as random access memory (RAM), and/or a nonvolatile memory, such as read-only memory (ROM). The memory device 1724 and/or the storage device(s) 1723 may store a variety of information and may be used for various purposes. For example, the memory device 1724 and/or the storage device(s) 1723 may store processor executable instructions 1725 (e.g., firmware or software) for the processor 1720 to execute. In addition, one or more control regimes for various welding processes, along with associated settings and parameters, may be stored in the storage device 1723 and/or memory device 1724, along with code configured to provide a specific output (e.g., initiate wire feed, enable gas flow, capture welding current data, detect short circuit parameters, determine amount of spatter) during operation.

In some examples, the welding power flows from the power converter 1710 through a weld cable 1726. The example weld cable 1726 is attachable and detachable from weld studs at each of the welding power supply 302*a*, 302*b* (e.g., to enable ease of replacement of the weld cable 1726 in case of wear or damage). Furthermore, in some examples, welding data is provided with the weld cable 1726 such that welding power and weld data are provided and transmitted together over the weld cable 1726. The communications transceiver 1718 is communicatively coupled to the weld cable 1726 to communicate (e.g., send/receive) data over the weld cable 1726. The communications transceiver 1718 may be implemented based on various types of power line communications methods and techniques. For example, the communications transceiver 1718 may utilize IEEE standard P1901.2 to provide data communications over the weld cable 1726. In this manner, the weld cable 1726 may be utilized to provide welding power from the welding power supply 302*a*, 302*b* to the wire feeder and the welding torch 108. Additionally or alternatively, the weld cable 1726 may be used to transmit and/or receive data communications to/from the wire feeder and the welding torch 108. The communications transceiver 1718 is communicatively coupled to the weld cable 1726, for example, via cable data couplers 1727, to characterize the weld cable 1726, as described in more detail below. The cable data coupler 1727 may be, for example, a voltage or current sensor.

In some examples, the power supply 302*a*, 302*b* includes or is implemented in a wire feeder.

The example communications transceiver 1718 includes a receiver circuit 1721 and a transmitter circuit 1722. Generally, the receiver circuit 1721 receives data transmitted by the wire feeder via the weld cable 1726 and the transmitter circuit 1722 transmits data to the wire feeder via the weld cable 1726. As described in more detail below, the communications transceiver 1718 enables remote configuration of the power supply 302*a*, 302*b* from the location of the wire feeder and/or compensation of weld voltages by the power supply 302*a*, 302*b* using weld voltage feedback information transmitted by the wire feeder 104. In some examples, the receiver circuit 1721 receives communication(s) via the weld circuit while weld current is flowing through the weld circuit (e.g., during a welding-type operation) and/or after the weld current has stopped flowing through the weld circuit (e.g., after a welding-type operation). Examples of such communications include weld voltage feedback information measured at a device that is remote from the power supply 302*a*, 302*b* (e.g., the wire feeder) while the weld current is flowing through the weld circuit Example implementations of the communications transceiver 1718 are described in U.S. Pat. No. 9,012,807. The entirety of U.S. Pat. No. 9,012,807 is incorporated herein by reference. However, other implementations of the communications transceiver 1718 may be used.

The example wire feeder 104 also includes a communications transceiver 1719, which may be similar or identical in construction and/or function as the communications transceiver 1718.

In some examples, a gas supply 1728 provides shielding gases, such as argon, helium, carbon dioxide, and so forth, depending upon the welding application. The shielding gas flows to a valve 1730, which controls the flow of gas, and if desired, may be selected to allow for modulating or regulating the amount of gas supplied to a welding application. The valve 1730 may be opened, closed, or otherwise operated by the controller 1712 to enable, inhibit, or control gas flow (e.g., shielding gas) through the valve 1730. Shielding gas exits the valve 1730 and flows through a cable 1732 (which in some implementations may be packaged with the welding power output) to the wire feeder which provides the shielding gas to the welding application. In some examples, the power supply 302*a*, 302*b* does not include the gas supply 1728, the valve 1730, and/or the cable 1732.

Figure 18:
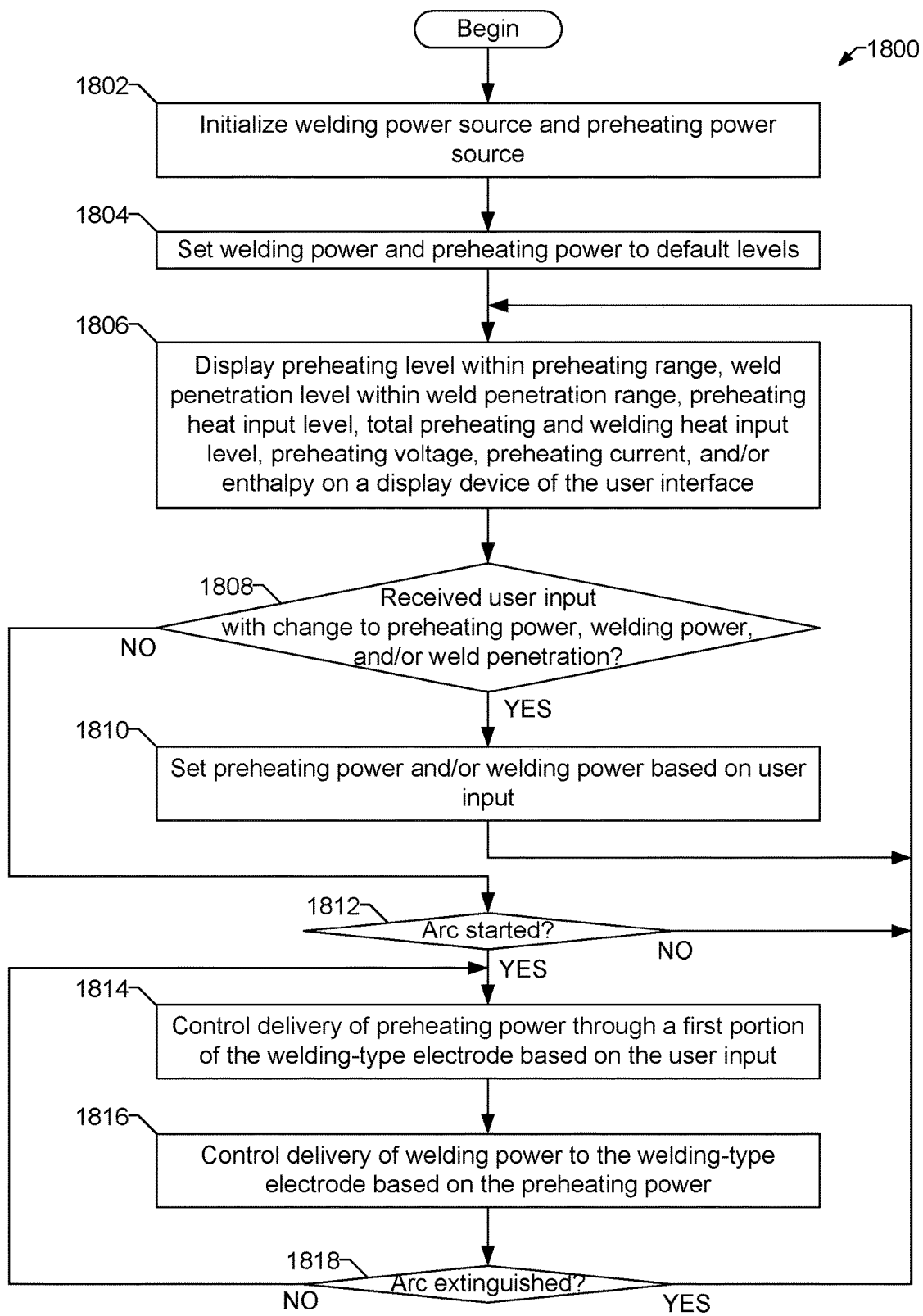
FIG. 18 is a flowchart representative of example machine readable instructions which may be executed by an electrode preheating control circuit and/or a weld control circuit to control preheating of a welding electrode based on a user input to a user interface.

FIG. 18 is a flowchart representative of example machine readable instructions 1800 which may be executed by the electrode preheating control circuit 322 and/or the weld control circuit 1504 to control preheating of a welding electrode (e.g., the electrode wire 114 of FIG. 4) based on a user input to a user interface (e.g., the user interface 1300 of FIG. 13). The example instructions 1800 are described below with reference to the electrode preheating control circuit 322. However, the instructions 1800 may also be partially or completely implemented by the weld control circuit 1504.

At block 1802, the electrode preheating control circuit 322 initializes the welding power supply 302*a* and the preheating power supply 302*b*. At block 1804, the electrode preheating control circuit 322 sets a welding power and a preheating power to respective default levels.

At block 1806, the electrode preheating control circuit 322 displays a preheating level within a preheating range, a weld penetration level within a weld penetration range, a preheating heat input level, a total preheating and welding heat input level, a preheating voltage, a preheating current, and/or an enthalpy on a display device (e.g., the indicators 1304, 1306) of the user interface 1300. The displayed information is based on the currently-selected preheating power level, welding power level, and/or weld penetration level.

At block 1808, the electrode preheating control circuit 322 determines whether a user input including a change to the preheating power, the welding power, and/or the weld penetration has been received. If a user input has been received (block 1808), at block 1810 the electrode preheating control circuit 322 sets a preheating power and/or a welding power based on the user input.

If a user input has not been received (block 1808), the electrode preheating control circuit 322 determines whether a welding arc has started (block 1812). In some examples, the arc may be replaced with another high-intensity source of energy such as a laser.

If the arc has started (block 1812), at block 1814 the electrode preheating control circuit 322 controls delivery of preheating power through a first portion of the welding-type electrode based on the user input. For example, the electrode preheating control circuit 322 may control the power supply 302*b* to provide preheating power to the electrode wire 114 via the contact tips 308, 318 based on the user-selected preheating power levels. At block 1816, the electrode preheating control circuit 322 controls delivery of welding power to the welding-type electrode based on the preheating power. For example, the effects of the preheating power may be determined from a feedback loop to the welding-type power, and/or the welding-type power levels may be determined based on the selected preheating power levels.

At block 1818, the electrode preheating control circuit 322 determines if the arc is extinguished. If the arc has not been extinguished (block 1818), control returns to block 1814 to continue controlling the preheating power and the welding power. For example, the electrode preheating control circuit 322 may determine if the trigger of the welding torch has been released to stop the weld. If the arc has been extinguished (block 1818), if the arc has not started (block 1812), and/or after setting the preheating power and/or the welding power based on user input (block 1810), control returns to block 1806.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

The present methods and/or systems may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

All documents cited herein, including journal articles or abstracts, published or corresponding U.S. or foreign patent applications, issued or foreign patents, or any other documents are each entirely incorporated by reference herein, including all data, tables, figures, and text presented in the cited documents.

What is claimed is:

1. A consumable electrode-fed welding-type system, comprising:
   a welding-type power source configured to provide welding-type power to a welding-type circuit, the welding-type circuit comprising a welding-type electrode and a first contact tip of a welding torch;
   an electrode preheating circuit configured to provide preheating power through a first portion of the welding-type electrode via a second contact tip of the welding torch; and
   an electrode preheating control circuit configured to control the preheating power based on a user input specifying the preheating power, wherein the user input specifies the preheating power as a ratio based on 1) at least one of preheating wattage, a voltage of the preheating power, a current of the preheating power, or an impedance of the first portion of the welding-type electrode, and 2) at least one of welding-type wattage, a voltage of the welding-type power, a current of the welding-type power, or an arc impedance.

2. The system as defined in claim 1, further comprising a user interface configured to receive the user input.

3. The system as defined in claim 2, wherein the electrode preheating control circuit is configured to control the welding-type power based on the selection.

4. The system as defined in claim 2, wherein the user interface is configured to:
   display a value representing at least one of the voltage of the preheating power, the current of the preheating power, the preheating wattage, a total energy of the preheating power and the welding-type power, or a heat input efficiency; and
   update the value in response to the user input.

5. The system as defined in claim 2, wherein the user input selects a voltage balance, a wattage balance, a current balance, a heat balance, or an enthalpy balance, between the electrode preheating circuit and the welding-type circuit.

6. The system as defined in claim 2, wherein the user interface is configured to:
   display values representing at least one of the preheating power or the welding-type power; and
   update the values in response to the selection of the preheating power.

7. The system as defined in claim 6, wherein the user interface is configured to display the values with reference to permitted selection ranges of the values.

8. The system as defined in claim 1, wherein the electrode preheating circuit is configured to provide preheating power via the second contact tip and at least one of the first contact tip or a third contact tip.

9. The system as defined in claim 1, further comprising a penetration sensor configured to detect a weld penetration, the electrode preheating control circuit configured to control the preheating power and the welding-type power to maintain the amount of weld penetration within a threshold range.

10. The system as defined in claim 1, further comprising a user interface to receive a selection of a wire deposition rate, the electrode preheating control circuit configured to control the preheating power based on the selection.

11. The system as defined in claim 10, wherein the electrode preheating control circuit is configured to:
 in response to an increase in the selected wire deposition rate, increase the preheating power and increase a wire feed speed of the electrode; and
 in response to an decrease in the selected wire deposition rate, decrease the preheating power and decrease a wire feed speed of the electrode.

12. The system as defined in claim 1, further comprising a display device to:
 display a balance between the preheating power and the welding-type power based on the user input;
 display a total heat input of the preheating power and the welding-type power; and
 update the displays of the balance and the total heat input in response to a change in the user input.

13. The system as defined in claim 1, wherein the electrode preheating control circuit is configured to control the preheating power based on at least one of a target total heat input for a weld, a travel speed, a target bead width, or a target penetration depth.

14. A method, comprising:
 determining, via a control circuit, a target preheating power level based on a user input specifying at least one of a target ratio between the preheating power and the welding-type power or a target weld penetration;
 controlling, via the control circuit, delivery of preheating power through a first portion of a welding-type electrode via a first contact tip of a welding torch based on the user input;
 controlling, via the control circuit, delivery of welding power to the welding-type electrode via a second contact tip based on the preheating power; and
 controlling a user interface device to display at least one of a voltage of the preheating power, a current of the preheating power, a preheating wattage, a heat input of the preheating power, a heat input of the welding-type power, or a total heat input of the preheating power and the welding-type power.

* * * * *